(12) United States Patent
Hall

(10) Patent No.: US 10,016,684 B2
(45) Date of Patent: Jul. 10, 2018

(54) SECURE GEOGRAPHIC BASED GAMING

(75) Inventor: Robert J. Hall, Berkeley Heig, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 191 days.

(21) Appl. No.: 12/914,886

(22) Filed: Oct. 28, 2010

(65) Prior Publication Data

US 2012/0108326 A1    May 3, 2012

(51) Int. Cl.
*A63F 13/71*    (2014.01)
*A63F 13/79*    (2014.01)
*A63F 13/49*    (2014.01)

(52) U.S. Cl.
CPC .............. *A63F 13/71* (2014.09); *A63F 13/79* (2014.09); *A63F 13/49* (2014.09); *A63F 2300/532* (2013.01); *A63F 2300/5573* (2013.01)

(58) Field of Classification Search
CPC .......... A63F 13/49; A63F 13/71; A63F 13/79; A63F 2300/532; A63F 2300/5573
USPC .......................................................... 705/51
See application file for complete search history.

(56) References Cited

U.S. PATENT DOCUMENTS

| 3,833,221 | A | * | 9/1974 | Van Tol | ..................... A63F 3/00 273/243 |
| 5,483,667 | A | | 1/1996 | Faruque | |
| 5,686,901 | A | | 11/1997 | Chen | |
| 5,930,716 | A | * | 7/1999 | Sonetaka | .............. H04W 16/06 370/337 |
| 6,006,328 | A | * | 12/1999 | Drake | ..................... G06F 21/14 713/188 |
| 6,015,344 | A | * | 1/2000 | Kelly et al. | ..................... 463/16 |
| 6,069,885 | A | | 5/2000 | Fong et al. | |
| 6,119,976 | A | | 9/2000 | Rogers | |
| 6,195,751 | B1 | | 2/2001 | Caronni et al. | |

(Continued)

FOREIGN PATENT DOCUMENTS

| WO | WO 02/054671 | 7/2002 |
| WO | WO 2007/016641 A2 | 2/2007 |

OTHER PUBLICATIONS

U.S. Appl. No. 12/837,168, filed Jul. 15, 2010, Hall.

(Continued)

*Primary Examiner* — Mamon Obeid
(74) *Attorney, Agent, or Firm* — Baker & Hostetler LLP

(57) ABSTRACT

Security in a geogame is maintained by implementing various security techniques. The various techniques provide specific advantages for different threat modes and attack styles against a geogame implemented via a mobile ad hoc network utilizing a geocast protocol. Jamming is detected by each player device listening for expected retransmissions of its own originated geocasts. If it fails to hear a retransmission, it concludes jamming. Network interdiction is detected by monitoring for received transmissions and/or periodically sending dummy transmissions to support other devices' detections. Location determination attacks are detected by recognizing "impossible" movements. Geogame interruption attacks are detected by detecting unauthorized requests to restart a geogame. Other security measures include utilizing cryptographic keys and/or pass phrases when geocasting. Various penalties within the context of a geogame are levied against a player if a security breach is detected.

19 Claims, 18 Drawing Sheets

(56) References Cited

U.S. PATENT DOCUMENTS

| | | |
|---|---|---|
| 6,304,556 B1 | 10/2001 | Haas |
| 6,360,107 B1* | 3/2002 | Lin ................. H04W 16/10 455/562.1 |
| 6,428,470 B1 | 8/2002 | Thompson |
| 6,516,199 B1 | 2/2003 | Soderkvist |
| 6,628,620 B1 | 9/2003 | Cain |
| 6,781,971 B1 | 8/2004 | Davis et al. |
| 6,807,165 B2 | 10/2004 | Belcea |
| 6,816,460 B1 | 11/2004 | Ahmed et al. |
| 6,870,846 B2 | 3/2005 | Cain |
| 6,873,613 B1 | 3/2005 | Dent |
| 6,879,574 B2 | 4/2005 | Naghian et al. |
| 6,909,706 B2 | 6/2005 | Wilmer et al. |
| 6,937,602 B2 | 8/2005 | Whitehill et al. |
| 6,940,832 B2 | 9/2005 | Saadawi et al. |
| 6,954,435 B2 | 10/2005 | Billhartz et al. |
| 6,958,986 B2 | 10/2005 | Cain |
| 6,987,777 B1 | 1/2006 | Cain |
| 7,027,822 B1 | 4/2006 | Hwang et al. |
| 7,152,110 B2 | 12/2006 | Pierce |
| 7,179,166 B1* | 2/2007 | Abbott .................. 463/9 |
| 7,197,326 B2 | 3/2007 | Acampora |
| 7,295,521 B2 | 11/2007 | Choi et al. |
| 7,307,978 B2 | 12/2007 | Carlson |
| 7,435,179 B1 | 10/2008 | Ford |
| 7,525,933 B1* | 4/2009 | Hall ................. H04L 12/189 370/310 |
| 7,540,028 B2* | 5/2009 | Ahmed et al. ................ 726/23 |
| 7,573,858 B2 | 8/2009 | Roh et al. |
| 7,613,467 B2 | 11/2009 | Fleischman |
| 7,669,052 B2* | 2/2010 | Asano et al. ................ 713/167 |
| 7,684,790 B2 | 3/2010 | Cartmell |
| 7,808,960 B1* | 10/2010 | Chan ................. H04L 47/125 370/310 |
| 7,813,326 B1 | 10/2010 | Kelm et al. |
| 7,864,168 B2 | 1/2011 | French |
| 7,895,273 B1 | 2/2011 | Haldar |
| 7,917,169 B1 | 3/2011 | Hall |
| 7,957,390 B2 | 6/2011 | Furlong et al. |
| 7,969,914 B1 | 6/2011 | Gerber |
| 7,970,749 B2 | 6/2011 | Uhlir et al. |
| 8,001,189 B2 | 8/2011 | Nielsen et al. |
| 8,073,327 B2 | 12/2011 | Mayer |
| 8,074,275 B2 | 12/2011 | Ramaiah et al. |
| 8,085,813 B2 | 12/2011 | Melick et al. |
| 8,128,405 B2 | 3/2012 | Preston et al. |
| 8,149,801 B2* | 4/2012 | Hall ................. H04W 40/20 370/338 |
| 8,149,846 B2 | 4/2012 | Mutnuru |
| 8,218,463 B2* | 7/2012 | Hall ................. H04W 40/023 370/310 |
| 8,248,367 B1 | 8/2012 | Barney et al. |
| 8,332,544 B1 | 12/2012 | Ralls et al. |
| 8,341,271 B2 | 12/2012 | Cho et al. |
| 8,355,410 B2* | 1/2013 | Hall ................. H04W 4/02 370/432 |
| 8,359,643 B2 | 1/2013 | Low et al. |
| 8,376,857 B1 | 2/2013 | Shuman et al. |
| 8,410,956 B2 | 4/2013 | Bai et al. |
| 8,483,652 B2 | 7/2013 | Hall |
| 8,599,848 B2 | 12/2013 | Janneteau |
| 8,702,506 B2* | 4/2014 | Hall ................. A63F 1/00 463/30 |
| 9,036,509 B1 | 5/2015 | Addepalli ................. H04W 4/046 370/259 |
| 9,161,158 B2 | 10/2015 | Hall |
| 9,319,842 B2* | 4/2016 | Hall ................. A63F 13/20 |
| 2001/0014094 A1 | 8/2001 | Epley |
| 2002/0067730 A1* | 6/2002 | Hinderks ................. G06Q 30/02 370/395.52 |
| 2002/0085582 A1* | 7/2002 | Kim ................. H04L 47/10 370/445 |
| 2002/0113872 A1 | 8/2002 | Kinjo |
| 2002/0141454 A1 | 10/2002 | Muniere |
| 2002/0155846 A1 | 10/2002 | Shiraga |
| 2002/0163912 A1 | 11/2002 | Carlson |
| 2002/0167960 A1 | 11/2002 | Garcia-Luna-Aceves |
| 2002/0169971 A1* | 11/2002 | Asano et al. ................ 713/193 |
| 2002/0176399 A1* | 11/2002 | Wilmer ................. H04L 45/00 370/349 |
| 2003/0074413 A1 | 4/2003 | Nielsen et al. |
| 2003/0103521 A1 | 6/2003 | Raphaeli |
| 2003/0105956 A1* | 6/2003 | Ishiguro et al. ................ 713/158 |
| 2003/0140149 A1 | 7/2003 | Marejka |
| 2003/0145095 A1 | 7/2003 | Liu |
| 2003/0153373 A1* | 8/2003 | Squibbs ................. A63F 13/005 463/1 |
| 2003/0174690 A1 | 9/2003 | Benveniste |
| 2003/0187570 A1* | 10/2003 | Impson ................. G08G 1/096716 701/117 |
| 2003/0193394 A1 | 10/2003 | Lamb |
| 2003/0235158 A1 | 12/2003 | Lee |
| 2004/0013062 A1 | 1/2004 | Hino et al. |
| 2004/0032847 A1 | 2/2004 | Cain |
| 2004/0083385 A1* | 4/2004 | Ahmed ................. H04L 63/1441 726/22 |
| 2004/0100936 A1 | 5/2004 | Liu |
| 2004/0121792 A1 | 6/2004 | Allen et al. |
| 2004/0151144 A1 | 8/2004 | Benveniste |
| 2004/0185881 A1 | 9/2004 | Lee et al. |
| 2004/0213270 A1 | 10/2004 | Su et al. |
| 2004/0259563 A1 | 12/2004 | Morton et al. |
| 2005/0036448 A1 | 2/2005 | Leeuwen |
| 2005/0039040 A1* | 2/2005 | Ransom ................. G01R 22/066 726/6 |
| 2005/0058151 A1 | 3/2005 | Yeh |
| 2005/0086350 A1* | 4/2005 | Mai ................. A63F 13/12 709/230 |
| 2005/0096065 A1 | 5/2005 | Fleischman |
| 2005/0129051 A1 | 6/2005 | Zhu et al. |
| 2005/0152318 A1 | 7/2005 | Elbatt et al. |
| 2005/0152378 A1 | 7/2005 | Bango et al. |
| 2005/0208949 A1 | 9/2005 | Chiueh |
| 2005/0243788 A1 | 11/2005 | Janczak |
| 2005/0254453 A1 | 11/2005 | Barneah |
| 2005/0259597 A1 | 11/2005 | Benedetto |
| 2005/0271057 A1 | 12/2005 | Kim et al. |
| 2006/0013154 A1 | 1/2006 | Choi et al. |
| 2006/0023677 A1 | 2/2006 | Labrador |
| 2006/0084444 A1 | 4/2006 | Kossi et al. |
| 2006/0126535 A1* | 6/2006 | Sherman ................. 370/254 |
| 2006/0128349 A1* | 6/2006 | Yoon ................. 455/343.2 |
| 2006/0148516 A1 | 7/2006 | Reddy et al. |
| 2006/0153157 A1 | 7/2006 | Roh et al. |
| 2006/0227787 A1 | 10/2006 | Furlong et al. |
| 2006/0236153 A1* | 10/2006 | Aaltonen ................. H04L 1/0057 714/25 |
| 2007/0008925 A1 | 1/2007 | Dravida et al. |
| 2007/0019591 A1 | 1/2007 | Chou et al. |
| 2007/0019594 A1 | 1/2007 | Perumal et al. |
| 2007/0104096 A1 | 5/2007 | Ribera |
| 2007/0110092 A1 | 5/2007 | Kangude et al. |
| 2007/0124395 A1 | 5/2007 | Edge et al. |
| 2007/0180533 A1 | 8/2007 | Ramaiah et al. |
| 2007/0198731 A1 | 8/2007 | Li et al. |
| 2007/0217346 A1 | 9/2007 | Zheng |
| 2007/0226765 A1* | 9/2007 | Bahnck ................. H04H 20/103 725/63 |
| 2007/0259716 A1* | 11/2007 | Mattice et al. ................ 463/36 |
| 2007/0259717 A1* | 11/2007 | Mattice et al. ................ 463/36 |
| 2007/0263571 A1 | 11/2007 | Hermann et al. |
| 2007/0265088 A1* | 11/2007 | Nakada et al. ................ 463/37 |
| 2007/0265089 A1 | 11/2007 | Robarts et al. |
| 2007/0266396 A1 | 11/2007 | Estermann |
| 2007/0283001 A1 | 12/2007 | Spiess et al. |
| 2007/0287437 A1* | 12/2007 | Cartmell ................. 455/414.3 |
| 2008/0015024 A1 | 1/2008 | Mullen |
| 2008/0039113 A1 | 2/2008 | Liu et al. |
| 2008/0058099 A1 | 3/2008 | Schwartz et al. |
| 2008/0076569 A1* | 3/2008 | Tabata ................. A63F 13/12 463/41 |
| 2008/0080401 A1* | 4/2008 | Ribiere et al. ................ 370/256 |

(56) References Cited

U.S. PATENT DOCUMENTS

| | | | |
|---|---|---|---|
| 2008/0095134 A1* | 4/2008 | Chen | H04B 7/2606 370/342 |
| 2008/0095163 A1* | 4/2008 | Chen | H04L 45/16 370/392 |
| 2008/0137624 A1 | 6/2008 | Silverstrim et al. | |
| 2008/0144493 A1* | 6/2008 | Yeh | 370/230 |
| 2008/0147854 A1* | 6/2008 | Van Datta et al. | 709/224 |
| 2008/0159236 A1 | 7/2008 | Ch'ng | |
| 2008/0163355 A1 | 7/2008 | Chu | |
| 2008/0186206 A1 | 8/2008 | Reumerman | |
| 2008/0192737 A1* | 8/2008 | Miyazaki et al. | 370/360 |
| 2008/0262928 A1 | 10/2008 | Michaelis | |
| 2008/0310439 A1 | 12/2008 | Gale | |
| 2008/0317017 A1 | 12/2008 | Wiemann et al. | |
| 2009/0005140 A1* | 1/2009 | Rose | A63F 13/00 463/7 |
| 2009/0017913 A1 | 1/2009 | Bell et al. | |
| 2009/0030605 A1 | 1/2009 | Breed | |
| 2009/0041039 A1* | 2/2009 | Bear et al. | 370/401 |
| 2009/0045977 A1 | 2/2009 | Bai et al. | |
| 2009/0046628 A1* | 2/2009 | Hall | H04W 4/021 370/328 |
| 2009/0073912 A1 | 3/2009 | Bauchot et al. | |
| 2009/0119696 A1* | 5/2009 | Chow | H04L 63/10 725/25 |
| 2009/0122753 A1 | 5/2009 | Hughes et al. | |
| 2009/0138353 A1 | 5/2009 | Mendelson | |
| 2009/0175223 A1* | 7/2009 | Hall | H04L 12/189 370/328 |
| 2009/0195401 A1 | 8/2009 | Maroney et al. | |
| 2009/0201860 A1* | 8/2009 | Sherman et al. | 370/329 |
| 2009/0207783 A1 | 8/2009 | Choi et al. | |
| 2009/0245518 A1 | 10/2009 | Bae et al. | |
| 2009/0248420 A1 | 10/2009 | Basir | |
| 2009/0274093 A1* | 11/2009 | Senouci | H04L 45/06 370/328 |
| 2009/0292926 A1* | 11/2009 | Daskalopoulos | G06F 21/10 713/176 |
| 2009/0298461 A1 | 12/2009 | O'Reilly | |
| 2009/0310516 A1 | 12/2009 | Goel et al. | |
| 2009/0323579 A1 | 12/2009 | Bai et al. | |
| 2009/0325603 A1 | 12/2009 | Van Os et al. | |
| 2010/0008259 A1 | 1/2010 | Yoon et al. | |
| 2010/0029245 A1 | 2/2010 | Wood et al. | |
| 2010/0042601 A1 | 2/2010 | Kelley et al. | |
| 2010/0060480 A1 | 3/2010 | Bai et al. | |
| 2010/0064307 A1 | 3/2010 | Malhotra et al. | |
| 2010/0067451 A1 | 3/2010 | Hall | |
| 2010/0069109 A1 | 3/2010 | Hall | |
| 2010/0074234 A1 | 3/2010 | Banks et al. | |
| 2010/0082513 A1* | 4/2010 | Liu | 706/46 |
| 2010/0115605 A1* | 5/2010 | Beattie | H04L 41/5019 726/15 |
| 2010/0125865 A1 | 5/2010 | Ospalik et al. | |
| 2010/0125867 A1* | 5/2010 | Sofos | H04N 7/165 725/28 |
| 2010/0128653 A1 | 5/2010 | Tateson | |
| 2010/0150129 A1 | 6/2010 | Jin et al. | |
| 2010/0162149 A1 | 6/2010 | Sheleheda et al. | |
| 2010/0169009 A1 | 7/2010 | Breed et al. | |
| 2010/0202346 A1* | 8/2010 | Sitzes | H04W 84/18 370/328 |
| 2010/0214987 A1 | 8/2010 | Mori | |
| 2010/0215040 A1 | 8/2010 | Kappler et al. | |
| 2010/0226342 A1 | 9/2010 | Coiling et al. | |
| 2010/0235633 A1* | 9/2010 | Asano | G06F 21/10 713/167 |
| 2010/0245124 A1 | 9/2010 | Bai et al. | |
| 2010/0248618 A1 | 9/2010 | Bai et al. | |
| 2010/0248843 A1 | 9/2010 | Karsten | |
| 2010/0250106 A1 | 9/2010 | Bai et al. | |
| 2010/0250346 A1 | 9/2010 | Bai et al. | |
| 2010/0251282 A1* | 9/2010 | Howcroft | H04N 7/16 725/25 |
| 2010/0279776 A1* | 11/2010 | Hall | H04W 4/02 463/42 |
| 2010/0287011 A1 | 11/2010 | Muchkaev | |
| 2010/0304759 A1 | 12/2010 | Leppanen et al. | |
| 2010/0329463 A1 | 12/2010 | Ratliff et al. | |
| 2011/0002243 A1 | 1/2011 | Sherman et al. | |
| 2011/0016225 A1* | 1/2011 | Park | H04N 21/44209 709/234 |
| 2011/0063116 A1 | 3/2011 | Lepley et al. | |
| 2011/0081973 A1* | 4/2011 | Hall | A63F 1/00 463/42 |
| 2011/0102459 A1* | 5/2011 | Hall | A63F 13/10 345/633 |
| 2011/0103302 A1 | 5/2011 | Hall | |
| 2011/0105151 A1 | 5/2011 | Hall | |
| 2011/0164546 A1* | 7/2011 | Mishra | H04W 40/026 370/312 |
| 2011/0177829 A1 | 7/2011 | Platt et al. | |
| 2011/0201369 A1 | 8/2011 | Kim et al. | |
| 2011/0230202 A1 | 9/2011 | Wood et al. | |
| 2011/0244887 A1 | 10/2011 | Dupray et al. | |
| 2011/0299685 A1* | 12/2011 | Hall | H04L 9/0822 380/273 |
| 2012/0016940 A1* | 1/2012 | Hall | 709/206 |
| 2012/0023550 A1* | 1/2012 | Xu | H04L 63/08 726/3 |
| 2012/0039231 A1 | 2/2012 | Suri et al. | |
| 2012/0058814 A1 | 3/2012 | Lutnick et al. | |
| 2012/0079080 A1 | 3/2012 | Pishevar | |
| 2012/0084364 A1 | 4/2012 | Sivavakeesar | |
| 2012/0094770 A1* | 4/2012 | Hall | A63F 1/00 463/42 |
| 2012/0101929 A1* | 4/2012 | Howard | G06Q 10/1053 705/35 |
| 2012/0108326 A1* | 5/2012 | Hall | A63F 13/71 463/29 |
| 2012/0128010 A1* | 5/2012 | Huang et al. | 370/468 |
| 2012/0157210 A1* | 6/2012 | Hall | A63F 13/65 463/40 |
| 2012/0236718 A1 | 9/2012 | Noureddin et al. | |
| 2012/0329538 A1* | 12/2012 | Hall | A63F 13/12 463/2 |
| 2013/0099941 A1* | 4/2013 | Jana | H04W 4/023 340/905 |
| 2013/0099976 A1* | 4/2013 | Cornwall | G01S 5/0257 342/450 |
| 2014/0082369 A1* | 3/2014 | Waclawsky et al. | 713/189 |
| 2014/0100027 A1* | 4/2014 | Harris | A63F 13/12 463/29 |
| 2014/0161006 A1* | 6/2014 | Hall | H04L 12/1845 370/310 |

OTHER PUBLICATIONS

U.S. Appl. No. 12/793,460, filed Jun. 3, 2010, Hall.
U.S. Appl. No. 11/264,834, filed Nov. 1, 2005, Hall.
U.S. Appl. No. 12/969,386, filed Dec. 15, 2010, Hall.
U.S. Appl. No. 13/169,892, filed Jun. 27, 2011, Hall.
U.S. Appl. No. 13/169,829, filed Jun. 27, 2011, Hall.
U.S. Appl. No. 13/277,895, filed Oct. 20, 2011, Hall.
Ko et al., "Geocasting in Mobile Ad Hoc Networks: Location-based Multicast Algorithms", Technical Report TR-98-018 Texas A&M University, Sep. 1998.
Ko, et al., "Flooding-Based Geocasting Protocols for Mobile Ad Hoc Networks," Mobile Networks and Applications, Dec. 2002, 7, 471-480.
Hall et al., "A Two-Level Quality of Service Scheme for Collision based on Mobile Ad Hoc Networks", IEEE, 1-4244-1513-06/07, 2007, 8 pages.
Hall, "RTEQ: Modeling and Validating Infinite-State Hard-Real-Time Systems", AT&T Labs Research, ASE 2007, Nov. 2007, 4 pages.
Hall, "Cheating Attacks and Resistance Techniques in Geogame Design," Proc. 2010 ACM FuturePlay Symposium, 2010, 82-89.
Hall, "An Improved Geocast for Mobile Ad Hoc Networking," IEEE Transactions on Mobile Computing, 2010, 1-14.

(56) References Cited

OTHER PUBLICATIONS

Illyas, "Body Personal, and Local Ad Hoc Wireless Networks", Chapter 1, CRC Press, 2003, 22 pages.
Liao et al., "GRID: A Fully Location-Aware Routing Protocol for Mobile Ad Hoc Networks", Telecommunication Systems, 2001, 18, pp. 1-26.
Shih et al., A Distributed Slots Reservation Protocol for QoS Routing on TDMA-based Mobile Ad Hoc Networks, 2004, (ICON 2004), Proceedings, 12$^{th}$ IEEE International Conference, Nov. 2004, 2, 660-664.
Shih et al., "CAPC: A Collision Avoidance Power Control MAC Protocol for Wireless Ad Hoc Networks", IEEE Communications Letters, Sep. 2005, 9(9), 859-861.
Tseng et al., "Fully Power-Aware and Location-Aware Protocols for Wireless Multi-hop Ad Hoc Networks", Proc. of IEEE Intl. Conference on Computer Communications and Networks (ICCCn), 2002, 6 pages.
Corbett, et al. "A Partitioned Power and Location Aware MAC Protocol for Mobile Ad Hoc Networks," Technical Report No. 553, University of Sydney, School of Information Technologies, Jul. 2004, 7 pages.
Panta, "GeoV2V: Vehicular Communications Using a Scalable Ad Hoc Geocast Protocol," AT&T Labs Research, 14 pages.
Balasubramaniam, et al. "Interactive WiFi Connectivity for Moving Vehicles," Proceedings of SIGCOMM, Aug. 17-22, 2008, 12 pages.
Maihofer, "A Survey of Geocast Routing Protocols," IEEE Communications Surveys, Jun. 2004, 32-42.
Das, et al., "SPAWN: A Swarming Protocol for Vehicular Ad-Hoc Wireless Networks," Proceedings of 1$^{st}$ ACM Vanet, Oct. 2004, 2 pages.
German Aerospace Center, Simulation of Urban Mobility, 2010, http://sumo.sourceforge.net, 1 page.
Gupta, et al., "The Capacity of Wireless Networks," IEEE Transactions on Information Theory, 46(2), Mar. 2000, 17 pages.
Hadaller, et al., "Vehicular Opportunistic Communication Under the Microscope," Proceedings of MobiSys, Jun. 11-14, 2007, 206-219.
Heissenbüttel, et al., "BLR: Beacon-Less Routing Algorithm for Mobile Ad-Hoc Networks," Elsevier's Computer Communications Journal, 27, 2003, 15 pages.
Hall, et al., "A Tiered Geocast Protocol for Long Range Mobile Ad Hoc Networking," Proceedings of the 2006 IEEE Military Communications Conf., 2006, 8 pages.
Hull, et al., "CarTel: A Distributed Mobile Sensor Computing System," Proceedings of ACM SenSys, Nov. 2006, 14 pages.
Eriksson, et al., "Cabernet: Vehicular Content Delivery Using WiFi," Proceedings of Mobicom, Sep. 2008, 12 pages.
Karp, et al, "GPSR: Greedy Perimeter Stateless Routing for Wireless Networks," Proceedings of Mobicom, 2000, ACM 2000, 12 pages.
Kuhn, et al., "Geometric Ad-Hoc Routing: Of Theory and Practice," Proc. 2003 Symposium on Principles of Distributed Computing, ACM 2003, 10 pages.
Lee, et al., "CarTorrent: A Bit-Torrent System for Vehicular Ad-Hoc Networks," Mobile Networking for Vehicular Environments, Sep. 2007, 6 pages.
Lee, et al., "Efficient Geographic Routing in Multihop Wireless Networks," Proc. MobiHoc 2005, ACM, 2005, 12 pages.
Ni, et al., "The Broadcast Storm Problem in a Mobile Ad Hoc Network," Proceedings of the 5$^{th}$ Annual ACM/IEEE International Conference on Mobile Computing and Networking, ACM, 1999, 151-162.
Manvi, et al., "Performance Analysis of AODV, DSR, and Swarm Intelligence Routing Protocols in Vehicular Ad Hoc Network Environment," Proceedings of IEEE Future Computer and Communications, Apr. 2009, 21-25.
Niculescu, et al., "Trajectory Based Forwarding and Its Applications," Proc. Mobicom 2003, ACM, 2003, 13 pages.
Ns-2, "The Network Simulator," 2010, http://isi.edu/nsnam/ns, 2 pages...

Schwingenschlogl, "Geocast Enhancements of AODV for Vehicular Networks," ACM SIGMOBILE Mobile Computing and Communications Review, Jun. 2002, 18 pages.
Shevade, et al., "Enabling High-Bandwidth Vehicular Content Distribution," Proceedings of CoNEXT 2010, Nov. 30-Dec. 3, 2010, 12 pages.
Yassein, et al., "Performance Analysis of Adjusted Probabilistic Broadcasting in Mobile Ad Hoc Networks," Proc. 11$^{th}$ Intl. Conf. on Parallel and Distributed Systems Workshops, 2005, 27 pages.
Zahn, et al., "Feasibility of Content Dissemination Between Devices in Moving Vehicles," Proceedings of CoNEXT 2009, Dec. 1-4, 2009, 11 pages.
Zorzi, et al., "Geographic Random Forwarding (GeRaF) for Ad Hoc and Sensor Networks: Multihop Peformance," IEEE Transactions on Mobile Computing, Dec. 2003, 11 pages.
Social + Gaming—SWiK: http://swik.net/social+ gaming.
http://askville.amazon.com/Wii-games-play-Internet-Family/AnswerViewer.do?requestId=6796582(2007).
Schutzberg, "Phone-based GPS-based Games: Missing Pieces"; http://www.directionsmag.com/articlephp?article_id=939 (Aug. 17, 2005).
"Boost Mobile introduces First Location-based, GPS games in US" http://www.physorg.com/news5824.html (Aug. 16, 2005).
"*Sony bigwig hints at GPS-enabled PSP games*"; http:www.vespacious.com/sony-bigwig-hints-at-gps-enabled-psp-games.html (Dec. 22, 2008).
*Steve:"GPS-enabled Cell Phone Games"* http://www.strangenewproducts.com/2005/08/gps-enabled-cell-phone-games.html (Aug. 15, 2005.
*Location-Enabled Mobile Gaming*; http://www.nn4d.com/site/global/market/affiliate_sites/lbsglobe/lbsapplications/mobilegaming.jsp (2007).
Aggarwal, Sudhir et al., "Accuracy in dead reckoning based distributed multi-player games", SIGCOMM '04 Workshops, (Proceedings of 3rd ACM SIGCOM Workshop on Network and System Support for Games), Aug. 30-Sep. 3, 2004, Portland, Oregon, pp. 161-165.
Bjerver, Martin, "Player Behaviour in Pervasive Games—using the City as a Game Board in Botfighters", Master of Science Thesis, KTH Computer Science and Communication, Stockholm, Sweden, 2006.
Bzflag(6):tank battle game—linux man page, Google date Feb. 1, 2001, downloaded from http://linux.die.net/man/6/bzflag.
De Souza e Silva, Adriana, "Alien revolt (2005-2007): A case study of the first location-based mobile game in Brazil", IEEE Technology and Society Magazine, Spring 2008, pp. 18-28.
Dialogic, "Adding location based services to existing architectures", Application Note: Location-Based Services, 9862-02, Oct. 2007, 14 pages, downloaded from http://www.dialogic.com/-/media/products/docs/signaling-and-ss7-components/9862_Ad-d_Locationbased_Servs_an.pdf.
Gallagher, Sean, "Army prepares test of new wireless war game gear", Defense Systems, Jul. 7, 2008, downloaded from http://defensesystems.com/articles/2008/07/army-prepares-test-of-new-wireless-war-game-gear.aspx.
Halas, Jacek, "Ghost Recon: Advanced Warfighter Game Guide, [Mission 01] Contact!—Objective: Locate Ramirez with the Drone", 2007, downloaded from http://guides.gamepressure.com/ghostreconadvancedwarfighter/guide.asp?ID=986.
Hohfeld, Alexander, "In and out of reality: Janus-faced location awareness in ubiquitous games", Journal of Software, 2(6), Dec. 2007, 86-92.
Kim, Seong-Whan et al., "Kalman filter based dead reckoning algorithm for minimizing network traffic between mobile nodes in wireless GRID", Embedded and Ubiquitous Computing, Lecture Notes in Computer Science, 4096, 2006, 162-170.
Lindo, Wayne A. et al., "Network modeling and simulation in the OneTESS program", Fall Simulation Interoperability Workshop 2006, Orlando, Florida, USA, Sep. 10-15, 2006, 155ff.
MyCheats web page, "Ghost Recon: Advanced Warfighter Superguide, Reach Ramirez", (Jul. 19, 2006), downloaded from http://mycheats.1up.com/view/section/3139558/18404/ghost_recon_advanced_warfighter/pc.

(56) References Cited

OTHER PUBLICATIONS

Santos, Nuno et al., "Vector-field consistency for ad-hoc gaming", Middleware 2007, LNCS 4834, 2007, pp. 80-100.
Sotamaa, Olli, "All the world's a Botfighter Stage: Notes on location-based multi-user gaming", Proceedings of Computer Games and Digital Cultures Conference, Tampere University Press, 2002, pp. 35-44.
Various Authors, The Wikipedia page for the "snake" computer game, Nov. 3, 2008 version, Wikipedia.com, downloaded by the USPTO from http://en.wikipedia.org/w/index.php?title=Snake_(video_game)&oldid=249370716 on Oct. 4, 2012.
U.S. Appl. No. 13/327,472, filed Dec. 15, 2011, Hall.
U.S. Appl. No. 13/333,084, filed Dec. 21, 2011, Hall.
U.S. Appl. No. 13/875,735, filed May 2, 2013, Hall.
U.S. Appl. No. 13/890,423, filed May 9, 2013, Hall.
Nickles et al., "On building location aware applications using an open platform based on the NEXUS Augmented World Model," Software and Systems Modeling, Dec. 2004, 3(4), 303-313.
Nintendo, The computer game "Mario Kart OS", released in North America on Nov. 14, 2005, published by Nintendo, as evidenced by the game FAQ by Alex, downloaded from http://db.gamefaqs.com/portable/ds/file/mario_kart_ds_h.txt, with a game FAQ reported upload date of Jul. 15, 2007, p. 11.
Winkler, Additional date evidence for the Ars Electronica organization archive document http://archive.aec.at/submission/2004/U19/1043/, retrieved from http://web.archive.org/web/20050508084628/http://www.aec.at/en/archives/prix_archive/prixproject.asp? iProjectID=12899, 2005, 1 page.
Winkler, The computer game "GPS::Tron", as evidenced by the Ars Electronica organization archive document http://archive.aec.at/submission/2004/U19/1043/, where the document has an earliest archive.org verified publication date May 4, 2005, pp. 1-2.
Hall, "Combinatorial Communications Modeling of Real-Time Engagement Adjudication Architectures", 2005 IEEE Military Communications Conference, Oct. 2005, vol. 3, 1488-1494.
Kaplan, et al., "The Analysis of a Generic Air-to-Air Missile Simulation Model", NASA Technical Memorandum 109057, Jun. 1994, 48 pages.
Trivette, Sensor integration for the One Tactial Engagement Simulation System (One TESS), downloaded from http://vault.swri.org/cms/papers/3793 Presentation_2005 SensorsGov OneTESS.pdf, 2005, 28 pgs.

* cited by examiner

SECURE GEOGRAPHIC BASED GAMING

TECHNICAL FIELD

The technical field generally relates to games based on the geographic location of the players (geolocation-based gaming or geogaming), and more specifically to security for geogames.

BACKGROUND

Electronic games, such as video games, are extremely popular. Electronic video games provide elements unobtainable or impractical in real world only games, such as simulated weaponry, virtual structures, artificial creatures, and complex scoring systems. A disadvantage of electronic games is that players tend to exercise too little and spend too much leisure time indoors, missing out on the health, cognitive, and developmental benefits of vigorous outdoor play.

Physical activity of a player can be incorporated into a video game (e.g., Nintendo's® Wii™). However, players typically are limited to playing the games within restricted environments. Players must remain in the immediate area in front of a television and game console, which keeps players from ranging over large outdoor areas or truly running, chasing, or climbing. For example, players may interact with a gaming system via wired and/or wireless controllers. The controllers have a limited range, thus, limiting physical video games to indoor use within a limited range from a gaming console and/or home entertainment system. Even wireless controllers limit game play to a small portion of a room by ultra short-range signals used to allow a player to see the video monitor. Often game consoles must be positioned on a stable, flat surface, and require 110 volt connections to a power supply. These characteristics leave gaming consoles with little to no portability.

Games based on the geographic location of the players (geogames) implemented via an hoc mobile network free players from the above-described range limitations. Mobile ad hoc networks are wireless networks comprising nodes that transfer packets peer-to-peer, without the packets necessarily traversing routers, access points, or other infrastructure. Nodes in a mobile ad hoc network are capable of moving around rapidly and dropping in and out of contact frequently and for potentially unbounded periods of time. As such, maintaining security in a geogame against cheating and other security attacks can be difficult.

SUMMARY

Security in a geogame is maintained by implementing any one or combination of various security techniques. The various techniques provide specific advantages for different threat modes and attack styles against a geogame implemented via a mobile ad hoc network utilizing a geocast (geographic broadcast) protocol. For example, jamming is detected by exploiting properties of the geocast protocol: each player device listens for expected retransmissions of its own originated geocasts. If it fails to hear any, it concludes jamming. Similarly, network interdiction is detected by monitoring for received transmissions in the local environment and/or periodically sending dummy transmissions to support other devices' detections. As another example, location determination attacks, such as GPS interdiction attacks, are detected by recognizing "impossible" movements. And, geogame interruption attacks are detected by, for example, detecting unauthorized requests to restart a geogame. Other security measures include utilizing cryptographic keys and/ or pass phrases when geocasting. Various penalties within the context of a geogame can be assessed against a player if a security breach is detected.

DETAILED DESCRIPTION OF ILLUSTRATIVE EMBODIMENTS

Figure 1:
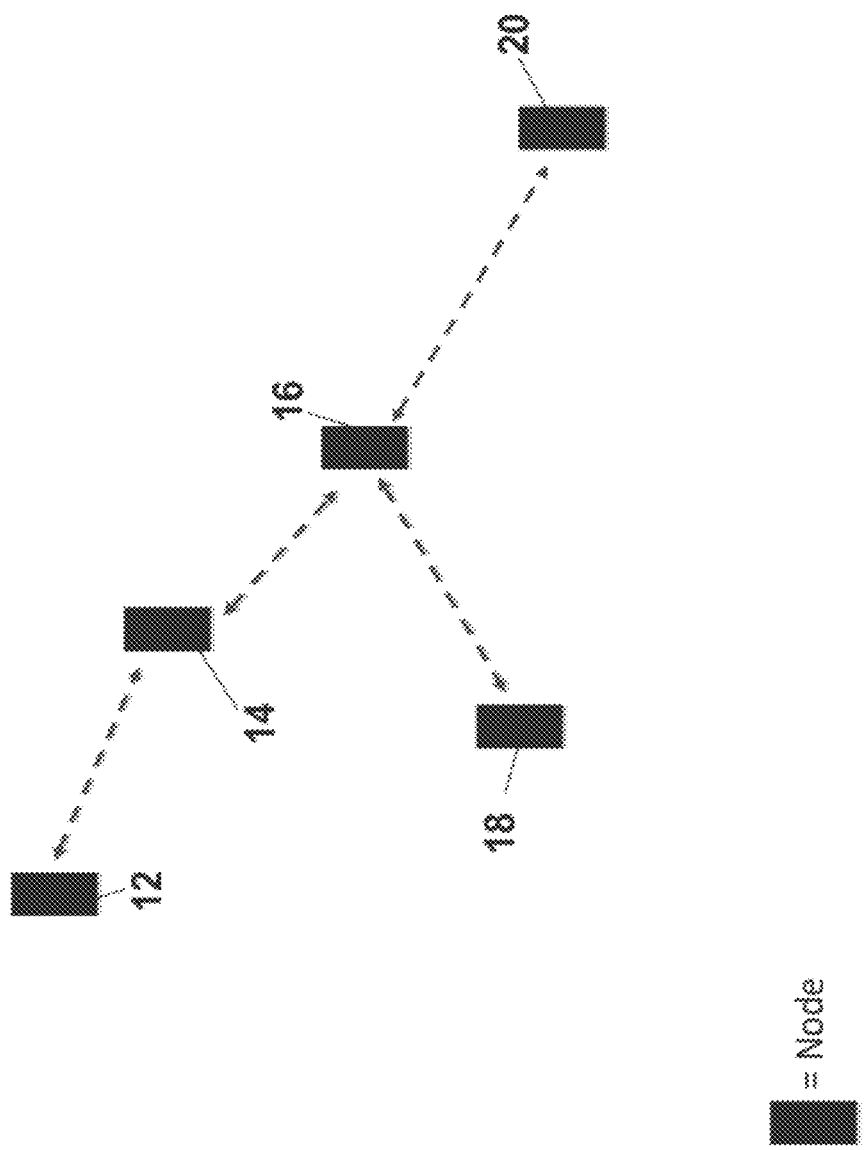
FIG. 1 illustrates an example secure mobile ad hoc network.

The herein described security techniques/mechanisms address the challenges presented by geogaming via mobile ad hoc networks. Security is maintained, cheating is detected, and cheating is discouraged in a geogame implemented via a mobile ad hoc network via various security techniques/mechanisms. In an example embodiment, network interdiction, (e.g., jamming, shielding a device, etc.) is detected by exploiting properties of the geocast protocol. In an example embodiment, a device being utilized in a geogame geocasts a message and monitors for expected retransmissions of the message. If the device fails to detect a retransmission, the device determines that network interdiction has occurred. The geocast message can be a message that is being geocast as part of the geogame, or a dummy message that is geocast for the purpose of detecting network interdiction. A message can be periodically geocast, randomly geocast, geocast upon a triggering event, or any appropriate combination thereof. In another example embodiment, a geogame application executed on a device can determine the amount of time the device has not received a geocast message. If the amount of time equals or exceeds a threshold value of time, the application determines that the device is trying to "hide" and penalties can be levied upon the device/player.

As another example, location determination attacks, such as GPS interdiction attacks, are detected by recognizing "impossible" movements. If the geogame application determines that a player's movement is not realistic, such as moving 100 meters in one second for example, penalties can be levied upon the device/player. In another example embodiment, a geogame application executing on a device determines that a player is attempting a geogame interruption attack by detecting an unauthorized requests to restart a geogame. In various embodiments, as a penalty the player can be expelled from the game. In another example embodiment, a player request to restart a game can be denied. Also described herein are various security techniques/mechanisms to mitigate geocast protocol packet insertion security attacks.

Although the herein described techniques/mechanisms are provided in the context of geogames, it is to be understood that the herein described techniques/mechanisms are not limited thereto, and are applicable to other geocast based applications. For example, jamming detection may be useful in a broad range of applications.

Various embodiments of secure geogaming techniques/mechanisms are described herein. The described embodiments are examples that may be embodied in various and alternative forms, and combinations thereof. As used herein, for example, "exemplary," and similar terms, refer expansively to embodiments that serve as an illustration, specimen, model, or pattern. The figures are not necessarily to scale and some features may be exaggerated or minimized, such as to show details of particular components. In some instances, well-known components, systems, materials, or methods have not been described in detail in order to avoid obscuring the instant disclosure. Therefore, specific structural and functional details disclosed herein are not to be interpreted as limiting, but rather as a basis for the claims and as a representative basis for teaching one skilled in the art how to employ the teachings instant application in various ways.

While the description includes a general context of computer-executable instructions, secure geogaming techniques/mechanisms also can be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, or the like.

In an example embodiment, secure geogaming techniques/mechanisms are implemented via a scalable, wireless, geographic broadcast ("geocast") protocol. Geogaming via a geocast protocol enables multiplayer gaming between mobile communication devices, such as wireless terminals, without relying on traditional network elements. No gaming console is required, thus eliminating the venue restrictions imposed by wired controllers and/or wireless controllers with limited ranges. Geogames can be played in wide open spaces, either indoors or outdoors. Geogaming can be fully distributed over an ad hoc network of mobile communications devices, eliminating the need for traditional mobile communications infrastructure and central servers. Because no network infrastructure is required to play, geogaming can take place in remote areas with little or no network access; for example in the middle of the woods. The scalable nature of the geocast protocol enables geogames to function equally well in both remote areas and crowded areas containing both geogame players and other users of mobile communications devices. Because multiplayer geogames do not require constant communication with a central server, game play can be more physically active and geographically wide ranging. Geogaming using tiered geocasting enables geogame players to participate in multiplayer gaming spanning great distances. For example, players on separate continents may participate in a single multiplayer geogame.

In an example embodiment, mobile devices taking part in a geogame are programmed with a geogaming application, which uses geolocation information obtained from a locating system, such as, for example, a global positioning system (GPS), or the like.

The geogaming application of each mobile device in the game controls a position of a simulated or virtual player based on location data received from the location system. In some embodiments, the geogaming application in the mobile device uses movement data from an inertial unit, or the like, of the mobile device to control a posture and/or movement of a virtual player, to render (e.g., display) a posture and/or movement of an actual player.

The scalable tiered geocast communication protocol is programmed into each mobile device taking part in the geogame, and any mobile device that operates to relay communications to or from the mobile devices taking part in the geogame. The mobile devices taking part in the geogame share changed game conditions, such as mobile device geolocation, between them via geocast data packets transmitted over one or both of a first tier, short-range, network, and a second tier, long-range, network according to transmission heuristics of the tiered geocast protocol.

The herein described geogaming architecture can be used to facilitate a wide variety of geogames. In one example, a geogame, which is described in U.S. patent application Ser. No. 12/835,385, entitled "Location Based Mobile Gaming Application And Method For Implementing The Same Using A Scalable Tiered Geocast Protocol," filed Jul. 13, 2010, which is incorporated by reference herein in its entirety, involves players virtually hitting, or virtually catching and throwing, back and forth a game object, such as a virtual ball or flying disc. Movements of the virtual game object are also shared between mobile devices in geocast data packets transmitted according to the tiered geocast protocol. In some embodiments, other game information, such as location and size of predefined playing areas, and scoring during the game, are propagated in geocast data packets according to the tiered geocast protocol.

Another example geogame, which is described in U.S. patent application Ser. No. 12/644,293, entitled "Augmented Reality Gaming Via Geographic Messaging," filed Dec. 22, 2009, which is incorporated by reference herein in its entirety, involves a virtual mortar shell or a virtual nuclear strike in a military simulation game. Yet another example geogame, also described in U.S. patent application Ser. No. 12/644,293, involves a virtual unmanned aerial vehicle (UAV), which can provide reconnaissance information about the location of other players of a geogame.

In another exemplary geogame, which is described in U.S. patent application Ser. No. 12/914,811, entitled "Geogame For Mobile Device," filed Oct. 28, 2010, which is incorporated by reference herein in its entirety, players, utilizing wireless devices, are required to continuously physically move within a defined boundary throughout the geogame. The wireless devices, with the aid of a location system, such as GPS, track the movements of the players. As players move, virtual tails are generated behind each player, and their locations are determined and geocast, via a wireless geographic broadcast protocol, to all players of the geogame. Each player observes all players movements and tail locations on his/her wireless device. If a player stops moving, the player is expelled from the game. If a player exits the confines of the boundary, the player is expelled from the game. If a player crosses a virtual tail, the player is expelled from the game. If two virtual tails cross, both players are expelled from the game. The last player remaining is the winner.

In an example embodiment, each mobile device taking part in the geogame is programmed with the scalable tiered geocast communication protocol. One example of a type of scalable protocol is the tiered mobile ad hoc network geocast protocol. Using the tiered geocast protocol, geogaming can be occasioned in all types of network scenarios, including those in which relevant areas are densely populated with participating mobile devices, those in which areas are sparsely populated, and even in areas long-range infrastructure such as cell towers, WIFI hotspot or other Internet router are not reachable by the mobile devices taking part in the game.

Geocast protocols differ from a traditional Internet protocol (IP) such as the uniform datagram protocol (UDP) in that messages are addressed to a destination geocast region instead of an IP address, such as an UDP address. Utilizing the geocast protocol, mobile devices in a target area do not need to register to a group address, as required of some other protocols. In some example embodiments, each geocast data packet is assigned, at origination, a globally unique packet serial number. The unique packet serial number is read by participating devices according to the protocol to, for example, determine whether a particular data packet is being received for a first time or has been received before. The packet serial number and all other packet information may be positioned in a header or body of the data packet.

The geogaming application is in some embodiments configured to store pre-set or previously identified geocast destination, locations, boundary, region, or the like, and allow the initiating player to select appropriately for geocasting.

Geocast data packets are transmitted according to heuristics of a tiered geocast protocol, which is described in more detail herein, to a destination geocast region for reception by all devices located in the region that are programmed with the geocast protocol, i.e., participating devices.

Although basic geocasting over only a single network (e.g., long-range network) enables communications in some situations where traditional networking is impractical or inadequate, it is in some embodiments preferable to selectively geocast over one or more of two or more networks (i.e., tiers) versus the flat configuration of a single network. The tiered geocast protocol of the present disclosure improves on single-network geocasting by providing the heuristics, or decision rules, for selectively propagating geocast data packets within a relatively short-range, peer-to-peer network, and bridging packets onto a long-range network for long-distance transport depending on various circumstances. Each participating mobile device and other nodes (e.g., WIFI access point or other router) have forwarding rules, including geographical parameters, and a look-up table for use in implementing the rules.

In one embodiment, the geocast system is configured such that a transmitting mobile device receives a confirmation that a geocast data packet was transmitted successfully. For example, it is contemplated that at least one of the mobile devices in a geocasting destination region, even if not a mobile device actively participating in the game, could return geocast a confirmation data packet indicating that the packet was received by a mobile device in the region. In one contemplated embodiment, although the protocol is based on a geographical address and not a device-specific address, a device-specific address of a target mobile device participating in the game is included in a geocast and the target mobile device initiates inclusion in a return geocast data packet of a confirmation of receipt message to the originating mobile device.

In addition, in some embodiments, a geocast data packet includes one or more fields, such as in a header or body of the packet, in which information related to a path taken by a packet is recorded. For example, a receiving node (e.g., mobile device or Internet router) receiving a geocast can retrieve data from the geocast header to identify an ordered list of the nodes whose transmissions led to the receiving node receiving it. In this way, path discovery is integrated into the transmission process. Any node can also use this information to send a source-routed unicast back to any node along the path, which is termed reverse-path forwarding (RPF).

Although a two-tiered communication system, including a first short-range peer-to-peer network and a long-range network, is primarily described herein, the geogaming application of the present disclosure may be implemented in connection with a protocol and communication system using other types of networks as well as or instead of those described herein, and in connection with more than two network tiers.

Propagations over the short-range network are made between devices programmed with the scalable tiered geocast protocol, whereby adjacent devices are within range of each other, such as radio range (e.g., 100 meters). The mobile devices and tiered geocast protocol are configured to transmit geocast data packets over one or more short-range networks, including existing wireless local area networks (WLANs), such an IEEE 802.11 network. As an example, when a first gaming mobile device is about 900 meters from an edge of a geocasting region including a second gaming mobile device, a geocast data packet from the first device would be broadcasted and participating intermediate devices would receive and retransmit the geocast data packet until it reached the geocast region, without need for transmission over an Internet router or other base station. In this example, depending on the location of a retransmitting device, the geocast data packet can be broadcast to the geocast region in one or two hops.

Geogaming is particularly suited to highly mobile devices without requiring connection to an infrastructure-based communications network. A mobile ad hoc network is an example of such a set of devices. Mobile ad hoc networks extend the reach of data networking into areas and scenarios in which infrastructure-based networking is impossible or impractical. For example, mobile ad hoc networks can allow first responders to use networked messaging and information applications in a zone where the network infrastructure has been destroyed by a disaster. Mobile ad hoc networks can provide military units operating in battlefield situations lacking infrastructure the same types of benefits as infrastructure-based networks. Mobile ad hoc networks can allow networking among low resource nodes, such as man-worn devices powered by lightweight wearable batteries, by allowing units to relay each other's short-range transmissions, instead of each unit transmitting long range directly to the destination.

To better understand the herein described security mechanisms, a description of mobile ad hoc networks is provided. A mobile ad hoc network comprises communications devices (also referred to as nodes) that communicate with each other via geographical broadcasting, referred to as geocasting. Geocasting is described in U.S. Pat. No. 7,525,933, entitled "System And Method For Mobile Ad Hoc Network," filed Nov. 30, 2005, issued Apr. 28, 2009, and incorporated by reference herein in its entirety. Geocasting uses a protocol in which an IP address is replaced with a geographic address. Thus, each geocast message comprises an indication of a location of a geographic region of intended reception of the geocast message. Generally, a packet is sent to every communications device located within a specific geographic region. The packet can contain an indication of the location of the sender, an indication of the geographic region, a payload, or a combination thereof, or the like. The communications devices in the geographic region, and any other communications devices that can communicate with them, are referred to, collectively, as a mobile ad hoc network. No registration is required to become a member of the mobile ad hoc network. Any communications device in the mobile ad hoc network can send a message to any or every communications device in the mobile ad hoc network. As communications devices move within communications range of any member of the mobile ad hoc network, they can become members of the mobile ad hoc network without requiring registration. The communications devices of the ad hoc network of communications devices communicate with each other. The ad hoc network of communications devices does not require base station terminals to control communications between the mobile devices. In example embodiments, base stations or routers may be used to relay messages between different mobile ad hoc networks, or to use other network transports such as other traditional internet protocol networks, such as the internet, to bridge messages between mobile ad hoc networks. Each communications device is capable of receiving and/or transmitting data packets to and/or from other communications devices in the mobile ad hoc network.

In an example embodiment, a communications device transfers packets to other communications devices according to heuristic decision rules that determine whether a receiving device will re-transmit a received packet. These rules effectively guide packets to their destinations and control communication traffic within the ad hoc network. The decision rules achieve this control by using statistics obtained and recorded by a communications device as it receives packets transmitted within reception range within its environment. This distributed packet transfer mechanism results in packets "flowing" to and throughout the geocast region specified in each packet. The communications devices in the geocast region receive and process each distinct packet, typically rendering the content to the user via a user interface of a communications device. Two packets are distinct if they contain distinct geocast identifiers. However, a re-transmitted copy of a packet generally will contain the same geocast identifier as the original packet.

FIG. 1 illustrates an example secure mobile ad hoc network. Communications devices (nodes) in the mobile ad hoc network can communicate via RF encoded with geographic information, via Bluetooth technology, via WiFi (e.g., in accordance with the 802.11 standard), or the like, or any combination thereof. For example, as depicted in FIG. 1, communication devices 12, 14, 16, 18, and 20 form a mobile ad hoc network. As shown in FIG. 1, communication device 12 communicates with communications device 14 directly (e.g., via Bluetooth). Communication device 14 communicates with communications device 16, and thus can retransmit information received from communications device 12 to communications device 16, and vice versa (retransmit information received from communications device 16 to communications device 12). Communications device 16 communicates with communications devices 18 and 20, and can relay information from/to communications devices 18 and/or 20 to/from communications devices 12 and/or 14.

Although not depicted in FIG. 1, it is possible, in a mobile ad hoc network, that, for a pair of nodes (A and B for example), node A can receive from node B but node B can not receive from node A. This asymmetric style of communication is potential likely in a mobile ad hoc network.

In an example embodiment, communications devices that receive a message can resend the message in accordance with the scalable wireless geocast protocol. For example, a communication device's ability to retransmit a message can be based on the number of times the message was previously received, the communication device's proximity with respect to the communications devices from which the message was sent, and/or the communication device's proximity to the geocast region. This can be implemented as a three step location-based approach, which is described in detail in the aforementioned U.S. Pat. No. 7,525,933, entitled "System And Method For Mobile Ad Hoc Network," filed Nov. 30, 2005, issued Apr. 28, 2009. First, in accordance with the location-based approach, the receiving communication device determines whether it has previously received the same message at least a predetermined number (N) of times. If not, it retransmits the message over the ad hoc network of communications devices. If so, the communications device progresses to the second step and determines whether the sending communications device is closer than some minimum distance away. If no prior transmitter of the message was closer than some minimum distance away, the communications device retransmits the message over the ad hoc network of communications devices. Otherwise, the communications device progresses to the third step and determines whether it is closer to the center of the geocast region than any sending communications device from which the message was received. If so, the communications device transmits the message over the ad hoc network of communications devices. If not, the communications device does not retransmit the message.

This location-based approach prevents the receiving communications device from retransmitting a message that was most likely already retransmitted by another communications device located close to it (and thus most likely reaching the same neighboring communications devices that it can reach). In addition, this location-based approach reduces the chance that the communications device will retransmit the same message multiple times to the same neighboring communications devices.

As mentioned, a mobile ad hoc network does not require a communications network infrastructure or a WiFi access point. However, in an example configuration, a mobile ad hoc network can utilize WiFi access points and/or a communications network infrastructure.

Figure 2:
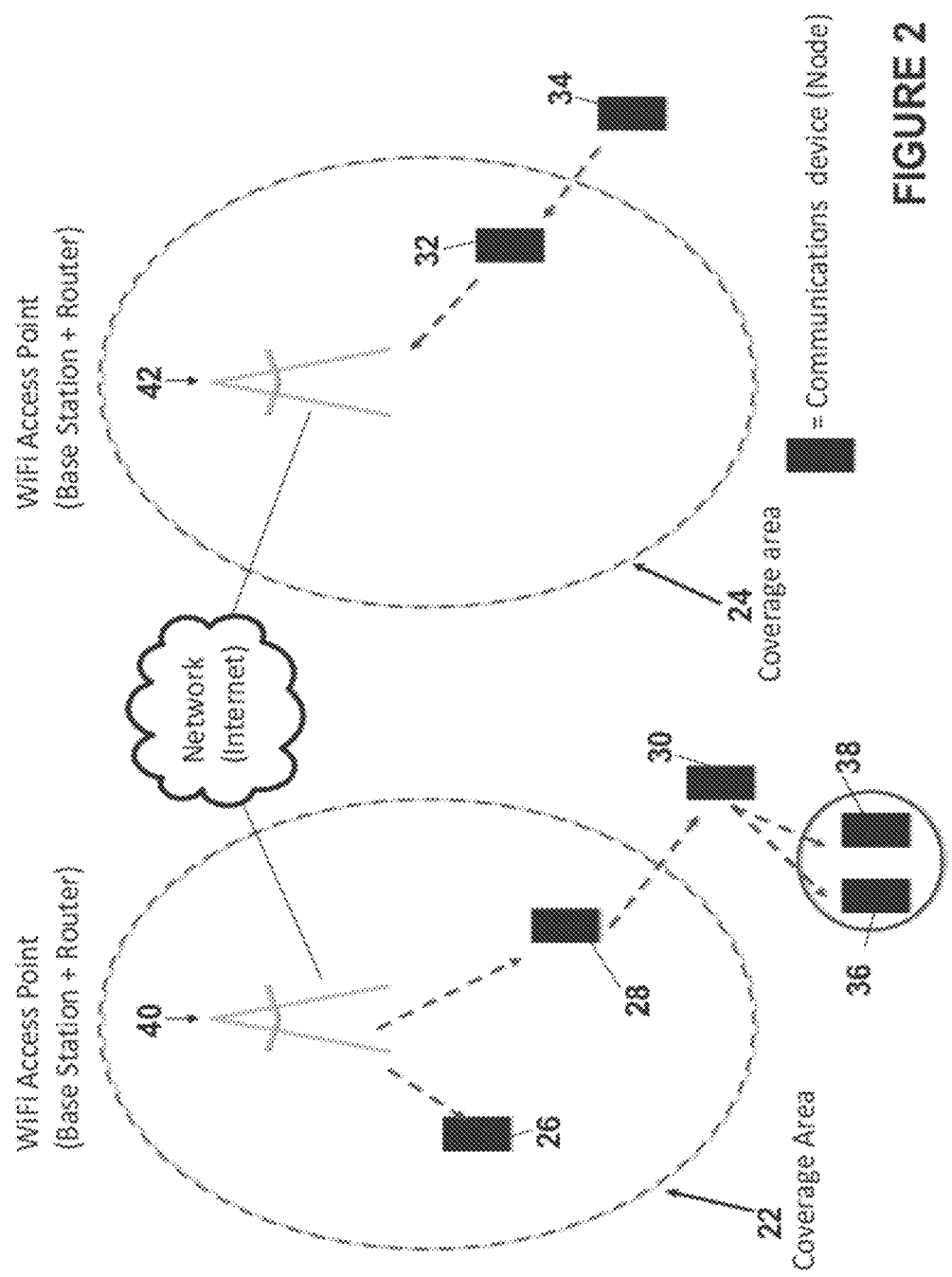
FIG. 2 illustrates example communications in an ad hoc network via a WiFi access point.

FIG. 2 illustrates example communications in an ad hoc network via a WiFi access point. As depicted in FIG. 2, communication devices 26, 28, 30, 36, and 38 form a mobile ad hoc network and communication device 32 and 34 form another mobile ad hoc network. Coverage area 22, which is the area covered by a WiFi access point 40, covers communication devices 26 and 28. Coverage area 24, which is the area covered by another WiFi access point 42 covers communication device 32. As shown in FIG. 2, communication device 34 transmits to communication device 32 directly (e.g., via Bluetooth). Communication device 32 retransmits to a WiFi access point 42 which in turn retransmits to the other WiFi access point 40. Communication devices 26 and 28 receive the transmission from the WiFi access point 40, and communication device 28 retransmits directly to communication device 30. And, as depicted, communication device 30 retransmits to other communication devices 36 and 38.

Figure 3:
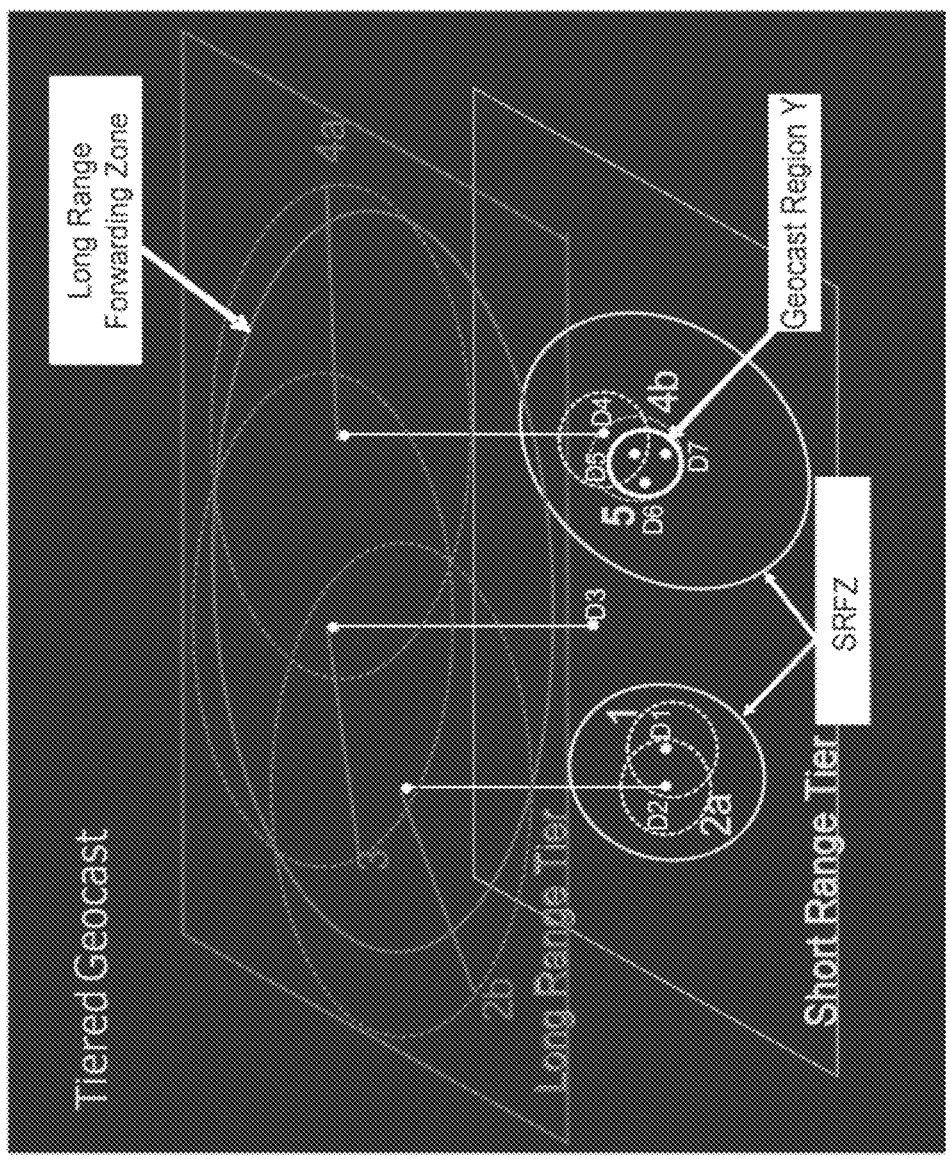
FIG. 3 illustrates an example mobile ad hoc network utilizing tiered geocasting and forwarding zones.

FIG. 3 illustrates an example mobile ad hoc network utilizing tiered geocasting and forwarding zones. Tiered geocasting uses long range (LR) transmitters (such as communications devices, etc), infrastructure, a communications network, a cellular tower, or a combination thereof, when available. Tiered geocasting assumes that at least one tier is usable by at least one of the communications devices. A long range tier is a tier wherein characteristic message transfers between devices occur over a longer physical range than those over some other tier. A long range tier can be wireless, wired, or a combination thereof.

A forwarding zone can be utilized to implement tiered geocasting. A common forwarding zone can be defined for all geocast packets or different forwarding zones can be defined for each type of geocast packet. Forwarding zones (as shown in FIG. 3, for example and without limitation) can be defined differently in different tiers, even for the same packet type or even same packet. Thus, forwarding heuristics can be applied independently per tier, with bridging at multi-tier capable nodes. In an example embodiment, a communications device retransmits a packet only if the communications device is located within the forwarding zone defined for the packet's type. This determination is in addition to the determinations described above and, if the communications device is not in the forwarding zone, the packet will not be retransmitted, even if one or more of the above conditions would otherwise have caused a retransmission hold.

As depicted in FIG. 3, nodes (e.g., communications devices) D1, D2, D3, D4, D5, D6, and D7, are at various locations within short range (SR) and long range (LR) tiers. All of devices D1, D2, D3, D4, D5, D6, and D7 together form a mobile ad hoc network, with devices D5, D6, and D7 being located in geocast region Y, hence being targets of a message sent by D1. Each communications device D1, D2, D3, D4, D5, D6, and D7 can determine its own geographical location through any type of location determination system including, for example, the Global Positioning System (GPS), assisted GPS (A-GPS), time difference of arrival calculations, configured constant location (in the case of non-moving nodes), any combination thereof, or any other appropriate means. Each communications device is operable to transmit and receive packets on a mobile ad hoc network. In addition, at any given time, some subset (possibly all) of the communications devices may be operable to transmit and receive packets over the long range tier network. For example, though not a limitation, in FIG. 3, devices D2, D3, and D4 can transmit and receive messages over both the short and long range tiers. Note that this latter fact is indicated visually in the diagram by D2, D3, and D4 each having two dots (one in the short range tier and one in the long range tier) connected by a vertical line. The long-rang tier network can be any network in which packets can be transmitted from one long range capable communications device to another long range capable communications device. Such packet networks can include, for example, an infrastructure-based network comprising wireless base stations (for up- and down-link) operating on a separate frequency from that used by an ad hoc network. In addition, the long rang tier network also could be implemented simply as another instance of an ad hoc network using distinct radio frequencies and possibly longer radio ranges.

Communications device D1 transmits the message, and communications device D2 receives the transmission from communications device D1. Communications device D2 retransmits (transmission 2a), within the short range tier and in accordance with the heuristics for the short range forwarding zone (SRFZ) as well as within the long range tier (transmission 2b). Communications D2, with long range transmission capability (in the long range tier) retransmits in the long range tier as well (transmission 2b). Communications device D3 receives the transmission 2b from communications device D2 and retransmits (as transmission 3) in the long range tier only. Communications device D4 receives the transmission 3 from communications device D3 and retransmits both on the long and short range tiers, resulting in transmission 4a in the long range tier and 4b in the short range tier. Communications device D5, within geocast region Y, receives the transmission 4a, and in turn retransmits (transmission 5) within the geocast region Y. Transmission 5 is received by the other devices in geocast region Y, namely devices D6 and D7, thus completing the geocast message transfer.

To analyze the vulnerabilities of cheating in a geogame, threat modes, specific attacks within a threat mode, and possible techniques for resisting or mitigating attacks are described. A threat mode is a category of attacks defined by a particular set of assumptions about what is trusted and what is not trusted. Two threat modes are described.

One example threat mode is a player-only threat mode. In the player-only threat mode, it is assumed that all devices are trusted and they are running the intended software with no malicious add-ons. During the geogame, the devices (and software installed thereon) remain uncompromised. Furthermore, there are no external devices present whose behavior affects game play which are under untrusted control. The only untrusted elements are the players themselves.

Another example threat mode is an external-device threat mode. In the external-device threat mode, it is assumed that attackers may additionally use external devices and may have the help of (non-player) confederates. For example, since geogames can be played in uncontrolled outdoor settings, it would be relatively easy for a player to stash a wireless capable laptop in the bushes near the play area running malicious scripts or the like. This sort of attack is much more difficult in traditional console gaming with wired controllers; even with wireless controllers (connected by Bluetooth or infrared), since the game play occurs typically in a home or other controlled environment, it is more difficult to carry out this type of attack.

In the player-only threat mode, if a player is using a trusted device and software, the player is limited to external manipulations consistent with normal use of the device. Due to the design principles of the geogames architecture a geogame is vulnerable to cheat attacks based on its properties. Three such attack classes described herein are network interdiction, GPS interdiction, and game interruption.

A network interdiction attack is one in which the cheater purposely interferes with the operation of the wireless network at a chosen time in order to avoid receiving one or more messages that would cause an unfavorable change of device state. One way to do this is to insert the device in a metal enclosure, like a foil pouch, which cuts off all radio reception. Another way to accomplish a network interdiction attack is to move the device so as to increase Fresnel Zone interference, for example, by moving into a depression so that the line of sight to the transmitter skims or intersects the Earth's surface. In an example embodiment, devices in a geogame are conducted using 802.11 based networking operating at 2.4 GHz and so are quite susceptible to Fresnel Zone interference.

In an example geogame wherein players fire shots at each other and utilize virtual unmanned aerial vehicles (UAVs) to search for each other, such cheating can help by allowing a player's device to miss receiving the geocast shot message from an opponent. If the player's device does not receive the shot message, the player will not be hit. Also, if a player can keep his/her device from receiving UAV query messages, the device will not send back responses that would allow opponents to locate it.

In an example geogame wherein virtual tails are generated behind each player and if a player crosses a virtual tail, the player is expelled from the game, interdicting game state messages from an opponent means that an opponent's tail will not change on the cheater's device, so the cheater could move across the opponent's actual path without crashing (being expelled).

Figure 4:
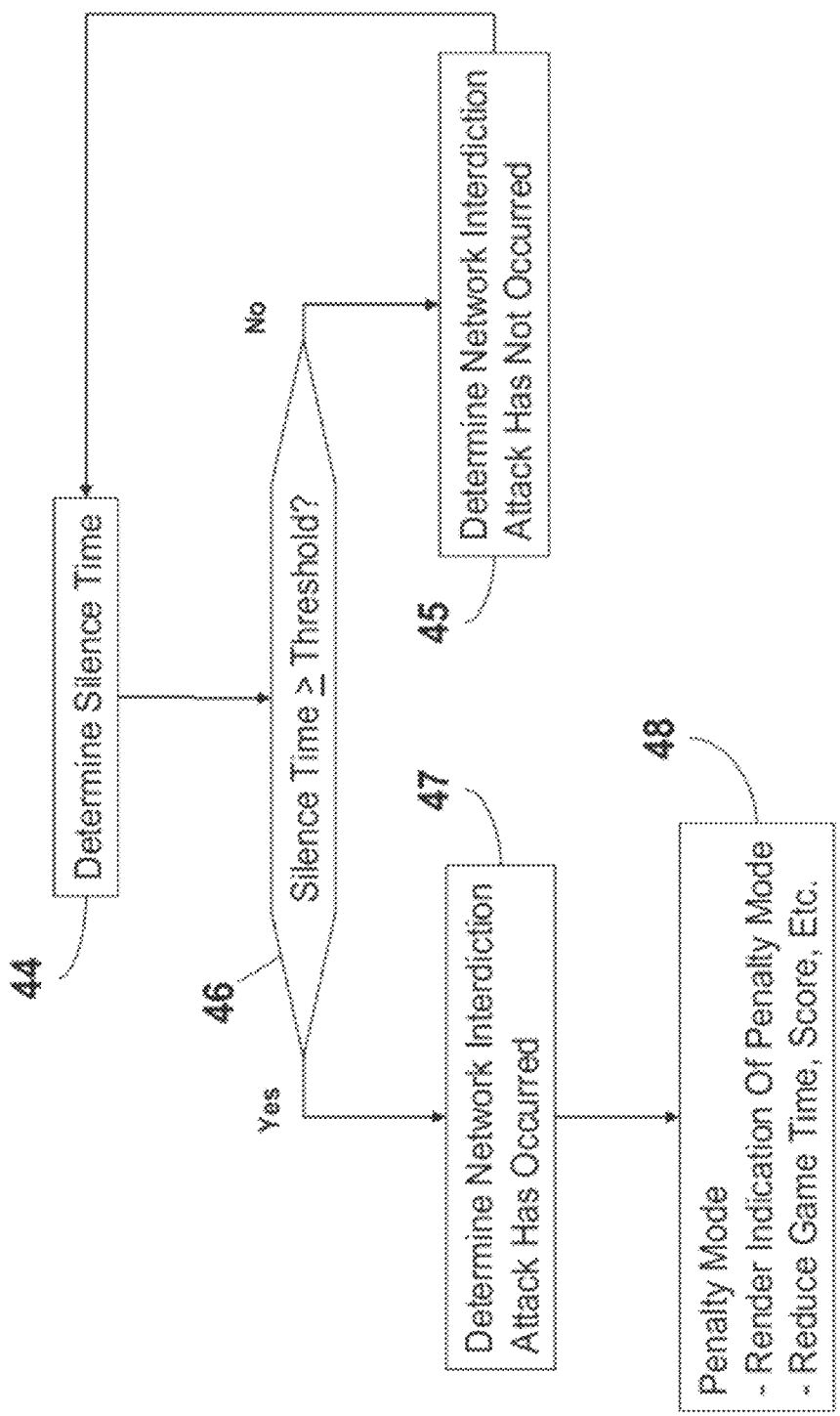
FIG. 4 is a flow diagram of an example process of resisting a network interdiction attack.

FIG. 4 is a flow diagram of an example process of resisting a network interdiction attack. The process depicted in FIG. 4 provides a disincentive to a player contemplating a network interdiction attack. That is, the process provides a disincentive to being out of contact by detecting and penalizing the network disconnectivity condition. Not all game designs make it possible to distinguish network disconnectivity from simple device silence due to player inaction. A device determines silence time at step 44. In an example embodiment, the mobile device keeps track of how long it has been since the last time it received any network packet, including those below the application level, such as received geocast transmissions not destined for the unit itself. At step 46, the device determines if the silence time is greater than or equal to a threshold value. The threshold value can be any appropriate amount of time, such as four seconds, for example. If it is determined, at step 46, that the silence time is less than the threshold value, it is determined that a network interdiction attack has not occurred at step 45. The process continues therefrom to determine silence time at step 44. If it is determined, at step 46, that the silence time is greater than or equal to the threshold value, it is determined that a network interdiction attack has occurred at step 47, and the device enter a penalty mode at step 48. In penalty mode, the device can render an indication that it is in penalty mode, game time can be reduce, the player could be expelled from the game, a score could be reduced, or the like, or any appropriate combination thereof. For example, each device in a geogame could keep track of silence time. When a device determines that the silence time equals or exceeds the threshold value, an out of contact indicator can be displayed on the device the player's score or game time can be reduced by a factor of the time out of contact (silence time). In an example embodiment, the longer the silence time the stiffer the penalty.

In an example embodiment, a device, or any number of devices, in the geogame can geocast a network interdiction attack detection message (e.g., a dummy message) for the purpose allowing other devices to determine silence time. The messages can be geocast periodically, or at any appropriate time. In an example embodiment, the message is geocast at least once per threshold time. For example, if the threshold time is four seconds, the message can be geocast every two or three seconds.

In another example embodiment, a network interdiction attack detection message (a dummy message) can be geocast by a device if the device goes more than a specified keep-alive period, such as 2 seconds for example, without transmitting. This dummy message can be geocast, for example, only if the device has not generated a transmission normally. This causes no application level state changes, but is provided merely to support connectivity detection. The dummy transmission need not be a full geocast, nor even relayed at all, if all devices do it independently.

Figure 5:
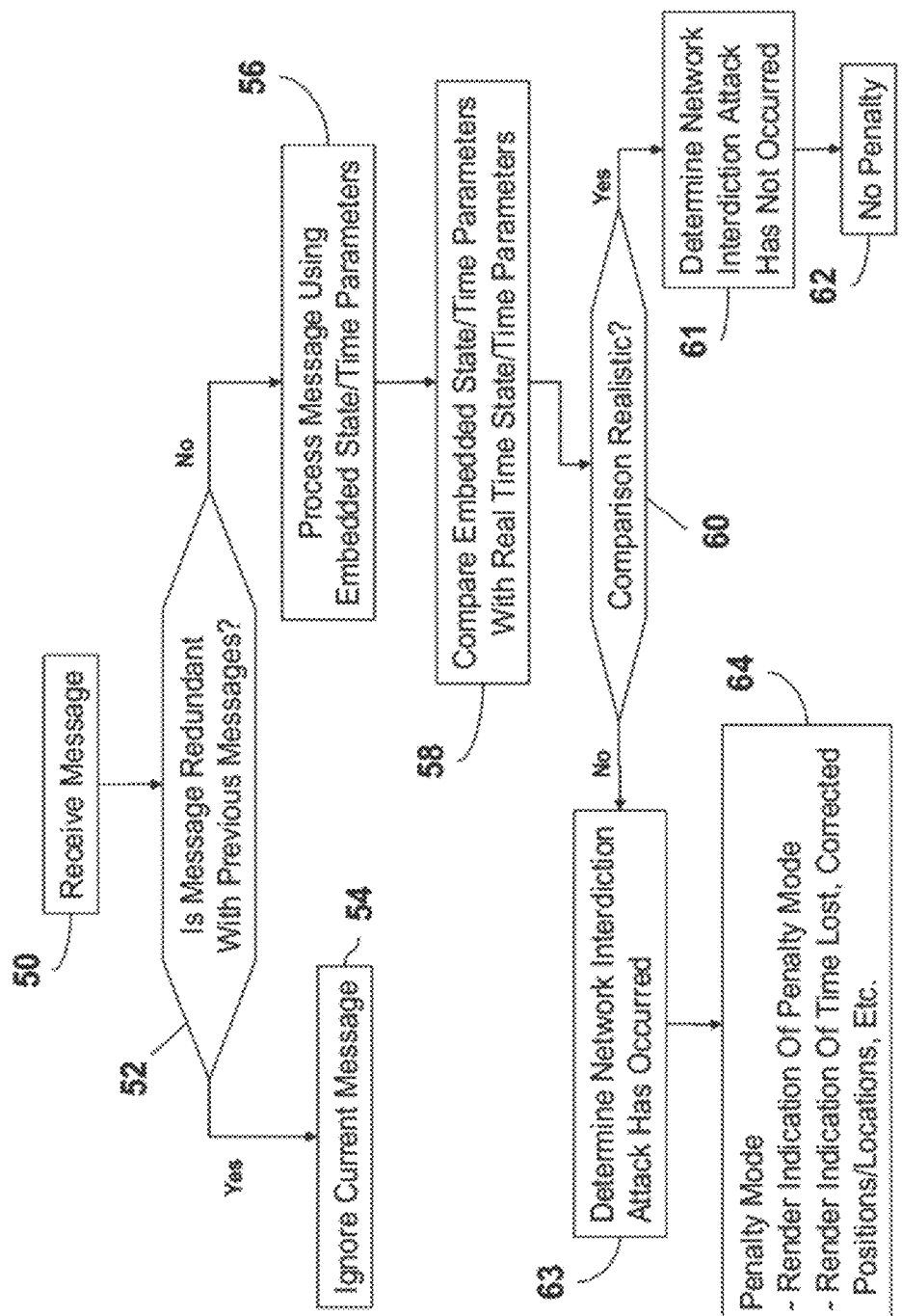
FIG. 5 is a flow diagram of another example process of resisting a network interdiction attack.

FIG. 5 is a flow diagram of another example process of resisting a network interdiction attack. The process depicted in FIG. 5 compensates for lost messages by implementing redundant messages. For example, in a geogame wherein players fire shots at each other, when firing a shot, a device can repeat the shot geocast messages many times (e.g., once per second for five seconds, once per second for ten seconds). The effect of this is that the cheater's device must remain out of contact through all the repetitions as well and, hence, be penalized heavily via the process depicted in FIG. 4. If the cheater's device receives one of the later repetitions without receiving the first message, it suffers two problems. It will still receive the shot and be hit at the same time it would have been had it received the first message. And, it will have the added disadvantage of having less time to run out of the way. Upon receiving a message, if it is determined that a player was cheating, penalties can be levied. For example, upon comparing the message information with the real time current state of the device, it is determined that the device should have been hit during the time a message was missed, penalties can be levied against the player.

In an example geogame wherein virtual tails are generated behind each player and if a player crosses a virtual tail, the player is expelled from the game, state messages indicating the state (e.g., time of each position fix in the tail) of the transmitting device can be included in the redundant messages. Thus, if a device is out of contact with a particular opponent for a period of time, once the device comes back in contact, the intersection algorithm can examine its own history and compare it to the state messages to determine if and when it crossed the opponent's tail based on the positions and times of the fixes. Thus, the attack outlined above, where one purposely interdicts a few messages in order to cross a boundary or tail will be defeated when the device later discovers the intersection. Upon receiving a message, if it is determined that a player was cheating, penalties can be levied. For example, upon comparing the message information with the real time current state of the device, it is determined that the device crossed a tail or crossed a boundary during the time a message was missed, penalties can be levied against the player.

At step 50, a device receives a message. The device determines if the message is redundant to a previously received message at step 52. If it is determined, at step 52, that the message is redundant, the current message is ignored at step 54. If it is determined, at step 52, that the message is not redundant, the message is processed at step 56. Any state information, timing parameters, or the like embedded in the message are processed. The results of processing the message are compared with the device real time current state at step 58. If it is determined, at step 60, that the results are realistic, that is the current state of geogame play is realistic, it is determined at step 61 that a network interdiction attack has not occurred, and no penalty is levied as depicted at step 62. If it is determined, at step 60, that the results are not realistic, that is the current state of geogame play is not realistic, it is determined at step 63 that a network interdiction attack has occurred, and the device can enter a penalty mode at step 64. In penalty mode, the device can render an indication that it is in penalty mode, game time can be reduce, the player could be expelled from the game, a score could be reduced, or the like, or any appropriate combination thereof.

Figure 6:
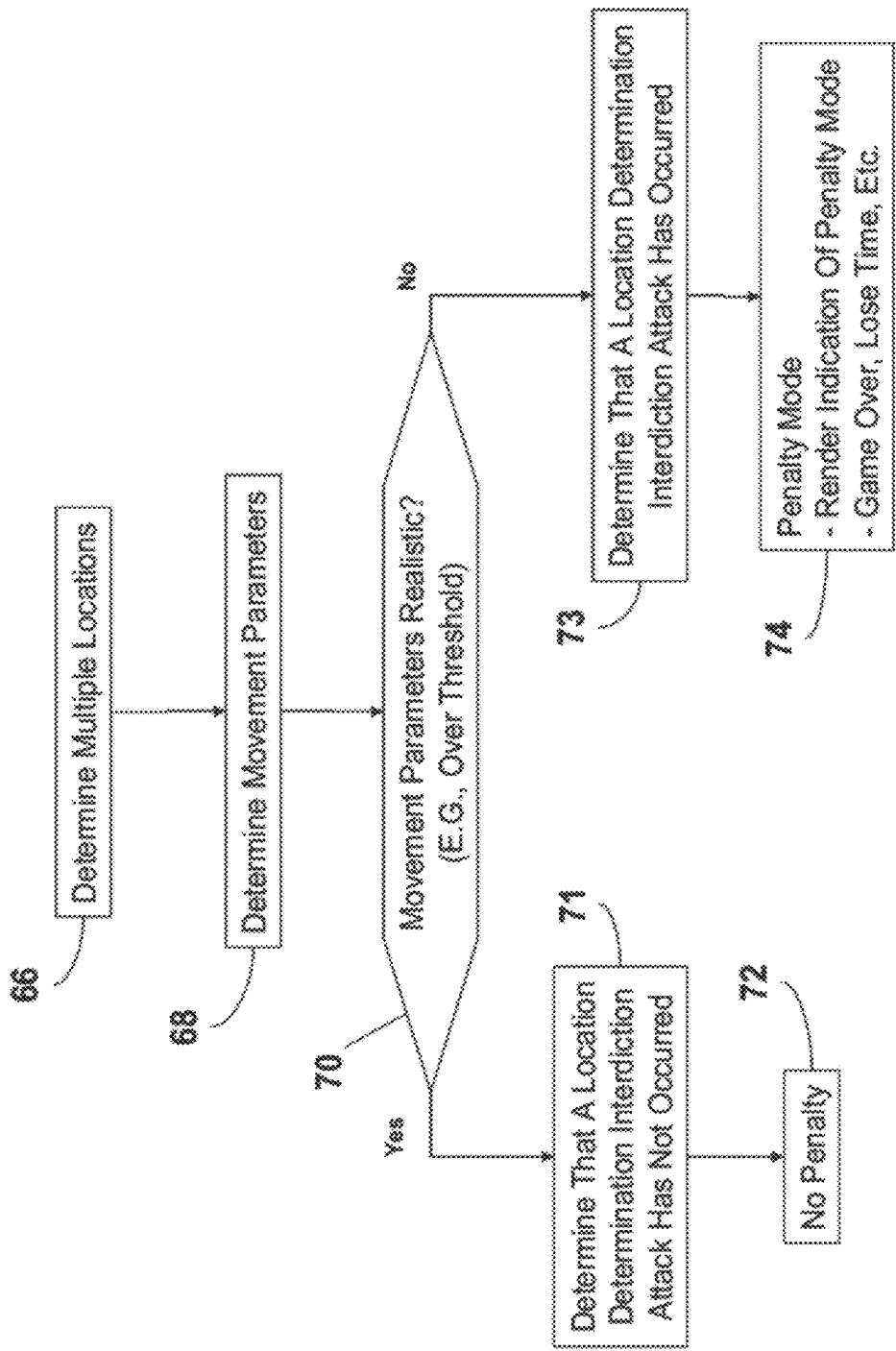
FIG. 6 is a flow diagram of an example process for resisting location determination interdiction attacks.

FIG. 6 is a flow diagram of an example process for resisting location determination interdiction attacks. In an example embodiment, as depicted by the process in FIG. 6, impossible, unrealistic movements are detected and the corresponding player is penalized. Location determination can be achieved with the assistance of the Global Positioning System (GPS). This involves receiving radio signals from sets of GPS satellites. If a device does not receive these signals correctly, the device can infer an inaccurate location. This can be useful to a cheater, for example, if a player wants to quickly move his/her location to avoid a game hazard. Satellite signals can be interdicted in similar ways to 802.11 signals, however, different specific techniques may be useful due to GPS operating on different wavelengths. This means different types of things are obstacles for GPS than for 802.11.

In a geogame wherein players fire shots at each other, for example, if a player is about to be hit by a shot, jumping far away instantaneously via GPS interdiction can save the player from being hit. In an example geogame wherein virtual tails are generated behind each player and if a player crosses a virtual tail, the player is expelled from the game, this sort of jumping can move a player much faster than an opponent can physically run, possibly enabling the player to surround more area.

Multiple locations are determined at step 66. Movement parameters are determined at step 68. Example movement parameters include velocity, speed, height, or the like. At step 70, it is determined if the movement parameters are realistic for the specific scenario. For example, if it is assumed that humans on foot can move at a maximum of 6 meters per second, a jump of 100 meters in a second is clearly physically invalid, and thus would be determined to be unrealistic. Because a device can lose satellite lock naturally due to motion, proximity of obstacles, terrain features, etc., optionally, there may be jumpiness in location reports. Thus, a tolerance can be factored into the determination if movement is realistic. Threshold value can be implemented. For example, for a player on foot, movements up to 20 meters per location report could be determined to be realistic, and movements over 100 meters per location report could be determine not to be realistic. The threshold value can change depending upon the scenario. If a player if in a vehicle, threshold values could be increased accordingly.

If, at step 70, it is determined that movement parameters are realistic, it is determined that a location determination interdiction attack has not occurred at step 71. And, no penalty is leveled as depicted in step 72. If, at step 70, it is determined that movement parameters are not realistic, it is determined that a location determination interdiction attack has occurred at step 73, and the device can enter a penalty mode at step 74. In penalty mode, the device can render an indication that it is in penalty mode, game time can be reduce, the player could be expelled from the game, a score could be reduced, or the like, or any appropriate combination thereof.

Because, according to the geogame architecture, the geogame is controlled in a distributed fashion by all devices working together, the geogame is potentially vulnerable to a cheater turning off his/her device, relaunching the game application, or otherwise interrupting game operations to gain advantage. For example, in a geogame wherein players fire shots at each other and utilize virtual UAVs to search for each other, a player can not be detected by UAVs if his/her device is turned off. Also, restarting the geogame can replenish the player's supply of weapons. Restarting a geogame wherein virtual tails are generated behind each player would erase a player's tail and all stored information about the player's opponents.

Figure 7:
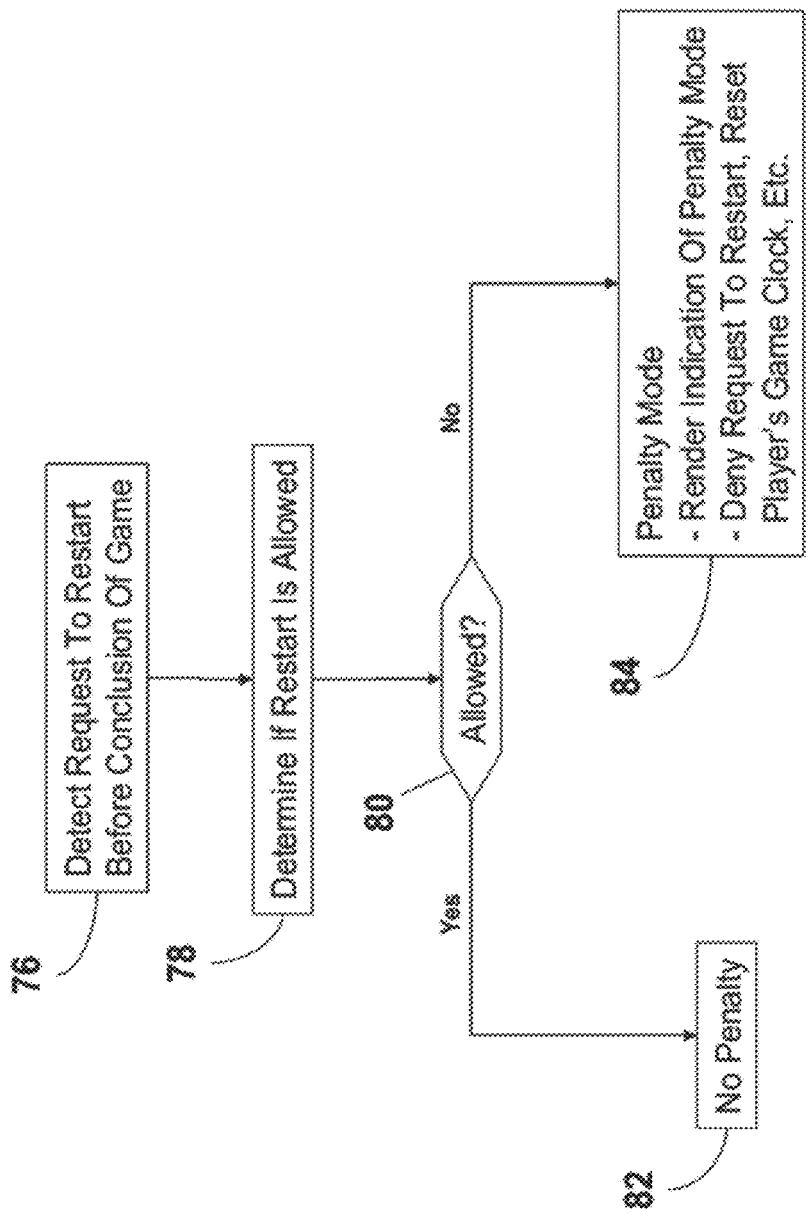
FIG. 7 is a flow diagram of an example process for resisting game interruption attacks.

FIG. 7 is a flow diagram of another example process for resisting game interruptions attacks. In accordance with the process depicted in FIG. 7, restarting of a geogame, if not authorized, is detected and the player is penalized. At step 76, a request to restart a geogame, before the conclusion of the geogame, is detected. It is determined, at step 78 if restarting the game is allowed (authorized). If it is determined that restarting is allowed, at step 80, no penalty is levied as depicted at step 82, If it is determined that restarting is not allowed, at step 80, the device can enter a penalty mode at step 64. In penalty mode, the device can render an indication that it is in penalty mode, game time can be reduce, the player could be expelled from the game, a score could be reduced, the request to restart the game could be denied, or the like, or any appropriate combination thereof.

In an example embodiment, a device could display a unique game identifier. For example, each declared geogame could be identified uniquely by the device ID of the game declarer plus the declared start time. These two values (numbers) could be displayed as the game serial number on the game display. A player could tap in to a geogame during, for example, a 30 second countdown period between first declaration and start time. After the start time is reached, a player may no longer join the geogame. When players compare displays at the end of the geogame, only those players displaying the correct game identifier information should be counted as finishing.

External device attacks include network interdiction and packet insertion. If a player (or non-playing confederate) can operate an external wireless-capable device, geogame communications are attackable. The open and uncontrolled character of geogame play areas allows hiding and operating such devices more easily than would be the case in other gaming venues. Here again it is assumed that the devices and device software are trusted.

Network interdiction could be implemented via a wireless device, such as a laptop hidden in the bushes or the like. This hidden laptop, or the like, could effectively jam communications for the geogame. This can be exploited by a cheating player to prevent his/her own device from receiving unfavorable packets. Simple blanket jamming by an external device could result in dead areas on the playing field. A cheater could retreat to these areas to interdict his/her communications. The cheater could loiter in the dead area while opponents spend time in other areas actually competing. Beyond simple jamming, a cleverer device could jam only packets originated from selected players while allowing packets from others. For example, by altering firmware or drivers for the wireless card, one could program it to recognize the MAC addresses of selected players and, if detected, immediately transmit noise to corrupt the ends of those packets. Further, the external device could be programmed to selectively jam only shot packets originated by non-cheating players. This would leave the cheater as the only one capable of launching a shot successfully. Another example selective packet jamming attack could jam only game state messages of the non-cheating players, so that the cheater not only could loiter in the jammed area, but could build walls around it to keep the others out.

Figure 8:
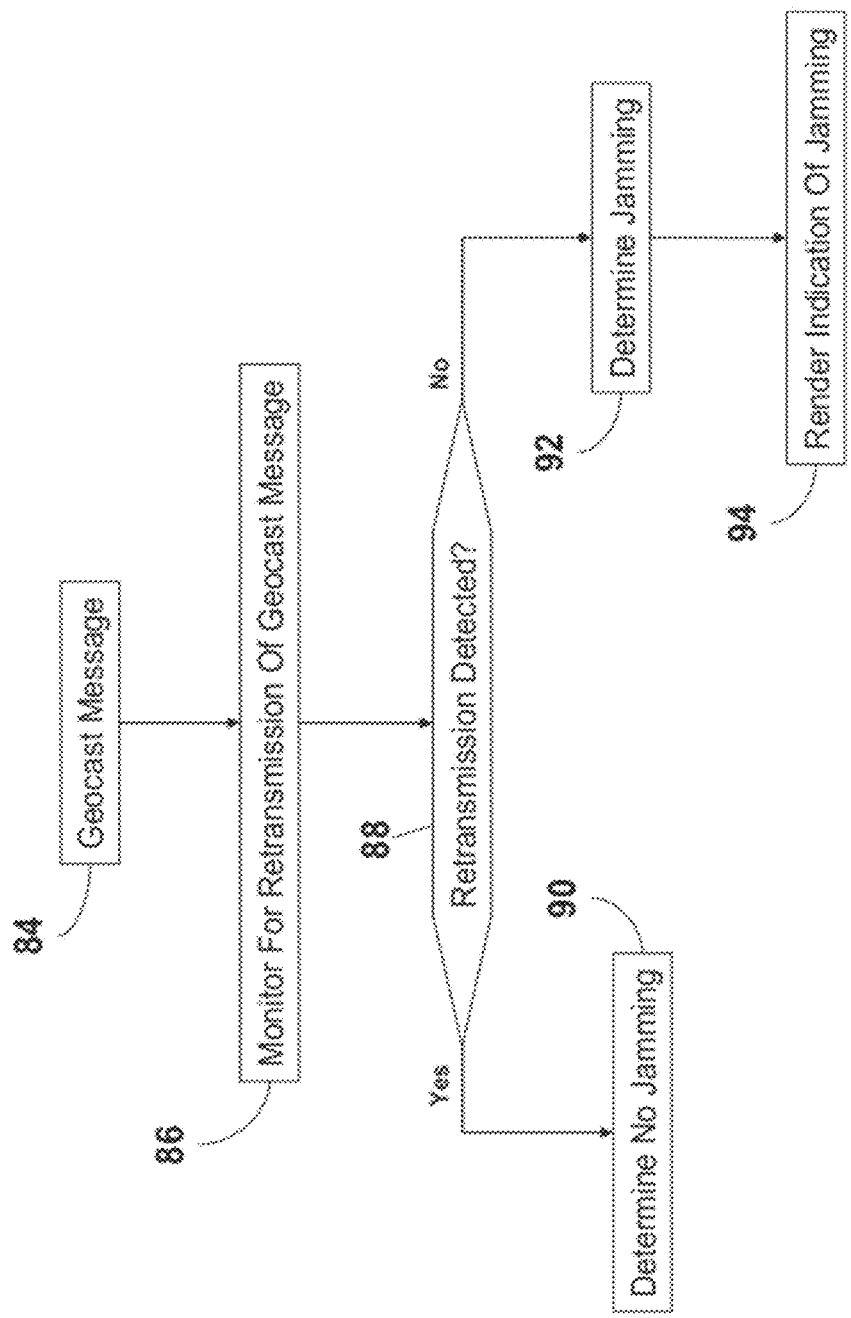
FIG. 8 is a flow diagram of an example process for resisting network interdiction attacks.

FIG. 8 is a flow diagram of an example process for resisting network interdiction attacks. The process depicted in FIG. 8 is effective against selective jamming as described above. In accordance with the an example implementation of the process depicted in FIG. 7, each device participating in a geogame listens for retransmissions of it own geocasts; if no retransmissions are detected, the device indicates that jamming is occurring, via its display. If over the course of game play many players notice the jamming display present, then it could cause a further investigation.

At step 84, a device geocasts an original message. At step 86, the device monitors (listens) for a retransmission, by another device, of it original geocast message. If a retransmission is detected, at step 88, it is determined that no jamming is occurring at step 90. If a retransmission is detected, at step 88, it is determined that jamming is occurring at step 92. An indication of jamming is rendered by the device at step 94.

To implement packet insertion an external device can send packets that are constructed to appear as if they came from a legitimate player's device. In an insecure wireless ad hoc network, this class of attacks can target the application level, such as by sending false shot, UAV query response, or scoring messages. This class of attacks also can target the protocol level, for example by aggressively retransmitting geocasts as early as possible (before other devices can retransmit normally), yet altering or corrupting the packets.

In a geogame wherein players fire shots at each other, an external device under control of a cheater (or non-playing confederate) could launch unlimited shot messages against opponents, giving the cheater an overwhelming ammo load advantage. It could also send spoofed and inaccurate UAV query responses which would provide the incorrect position of the cheater to other players. Spoofed GPS signals applied at selected times could help a cheater quickly move out of a shot effect area.

In an example geogame wherein virtual tails are generated behind each player and if a player crosses a virtual tail, the player is expelled from the game, an external device could send to the cheater's device inaccurate game state messages for opponents, such as with offset or missing tail segments and positions, thereby allowing the cheater to move where otherwise a crash would result. Spoofed GPS signals applied at selected times could help a cheater to quickly sprint ahead of opponents to help surround them.

In an example embodiment, a solution to packet insertion by external devices utilizes encryption to provide network packet authentication. That is, a signing and verification key, such as an AES key, is issued in common to all valid installations of the geogame application. Each packet can be digitally signed using this key, and a device receiving a packet first verifies the signature on the packet. Assuming this key is known only on the trusted devices, the external device can not create a valid packet, so any packets transmitted by the external device will be ignored by trusted devices.

A property of geocast communications is that geocasts are invulnerable to packet-replay attacks. The geocast protocol is built to use retransmissions of packets, so each node is designed to handle hearing multiple copies of each packet, processing at most one such copy. Replayed packets from an external device will not cause invalid repetitions or other unwanted state changes.

If the shared signing key is distributed with the application download, it is always possible that a cheater could reverse engineer the key out of the download and then transfer this to the external device. This would then allow the device to insert packets. An example solution to this problem is to design the devices to accept one or more pass phrase strings at the outset of play via the device's user interface; use the pass phrase strings to generate the secret shared key. Thus, in one usage scenario, a single trusted player enters this pass phrase key into the device of each player without disclosing it to other players. Assuming the trusted player is not the cheater, the external device has no way of getting the key. An even stronger method is for each of two players to enter a pass phrase into each device; the key is then constructed from both pass phrases, with no single player knowing enough to reconstruct the key. This scheme can be extended to the case of all players entering a pass phrase into each device. In that case, no proper subset of the players can collude to infer the key for use by the external device.

Figure 9:
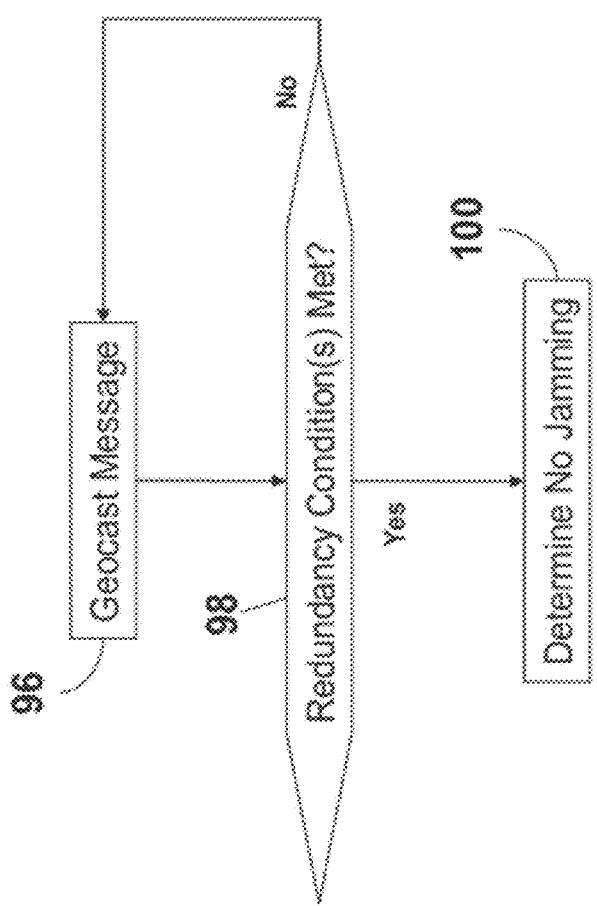
FIG. 9 is a flow diagram of another example process for resisting network interdiction attacks via redundancy.

FIG. 9 is a flow diagram of another example process for resisting network interdiction attacks via redundancy. A message, M for example, is geocast at step 96. At step 98, it is determined if an appropriate redundancy condition, or conditions, has/have been met. For example, it can be determined if the message, M, was sent a specific or predetermined number of times. As another example, it can be determined if a copy of the geocast message (sent by another device) was received at least once by the sending device. If no redundancy condition has been met (at step 98), the process proceeds to step 96 and geocasts the message again. If a redundancy condition (e.g., has message been sent a specific number of times, has message been sent and a copy received) has been met (at step 98), it is determined, at step 100, the no jamming has occurred.

Figure 10:
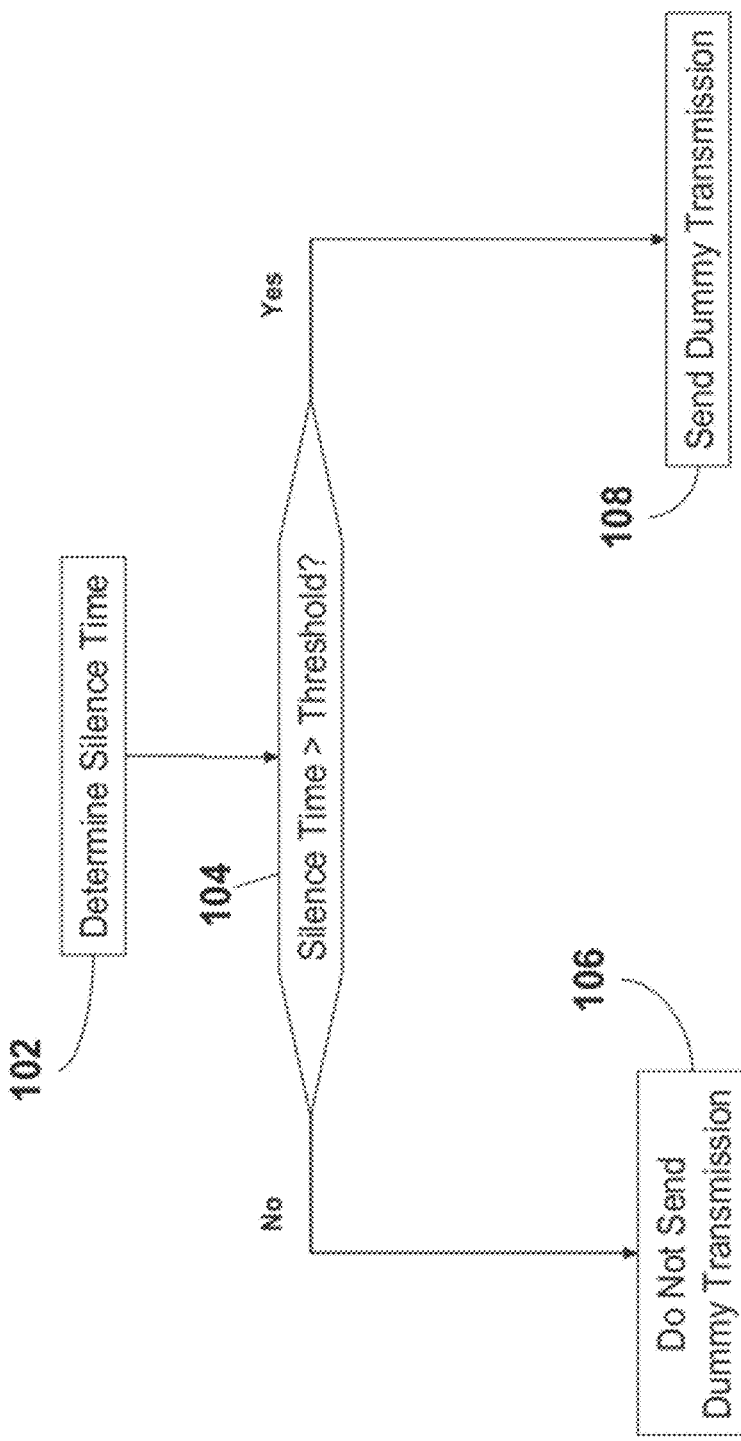
FIG. 10 is a flow diagram of another example process for resisting network interdiction attacks via dummy transmissions.

FIG. 10 is a flow diagram of another example process for resisting network interdiction attacks via dummy transmissions. At step 102, silence time is determined. In an example embodiment, the mobile device keeps track of how long it has been since the last time it received any network packet, including those below the application level, such as received geocast transmissions not destined for the unit itself. At step 104, the device determines if the silence time is greater than a threshold value. The threshold value can be any appropriate amount of time, such as four seconds, for example. If it is determined, at step 104, that the silence time is less than or equal to the threshold value, no dummy transmission is geocast as depicted at step 106. If it is determined, at step 104, that the silence time is greater than the threshold value, a dummy transmission is geocast at step 108.

Figure 11:
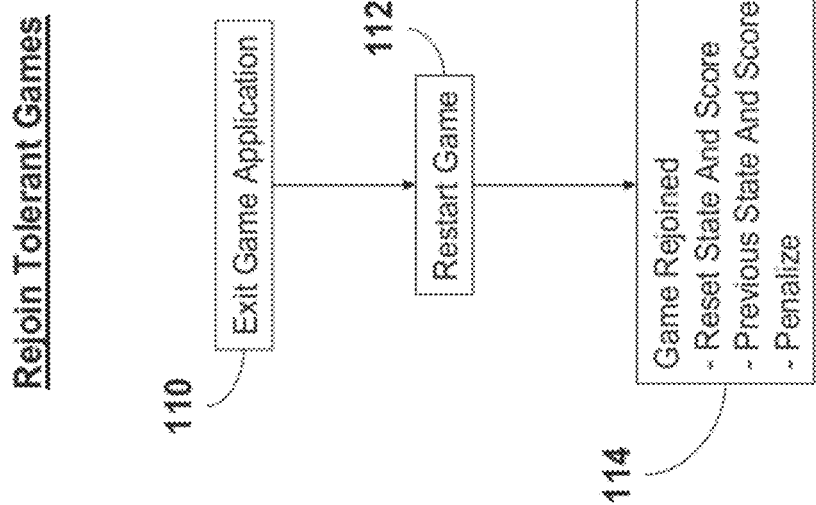
FIG. 11 is a flow diagram of an example process of existing and restarting a geogame.

FIG. 11 is a flow diagram of an example process of existing and restarting a geogame. The process depicted in FIG. 11 could be used, for example, to resist a game interruption attack. In accordance with the process depicted in FIG. 11, rejoining a geogame is allowed. However, the user could be penalized. At step 110, the game application is exited by a user action on the device. The geogame is restarted at step 112. The geogame may be restarted, for example, as a result of a request to restart the geogame by the user. The user rejoins the geogame at step 114. In various example embodiments, the user can rejoin the game with his/her game state being reset (e.g., as if the user just started game play) and the score being reset (e.g., to zero), the user can rejoin the game with his/her previous game state being and previous score being, or the user can rejoin the game with an appropriate penalty. Under penalty, for example, the device can render an indication that it is in penalty mode, game time can be reduce, a score could be reduced, or the like, or any appropriate combination thereof.

Figure 12:
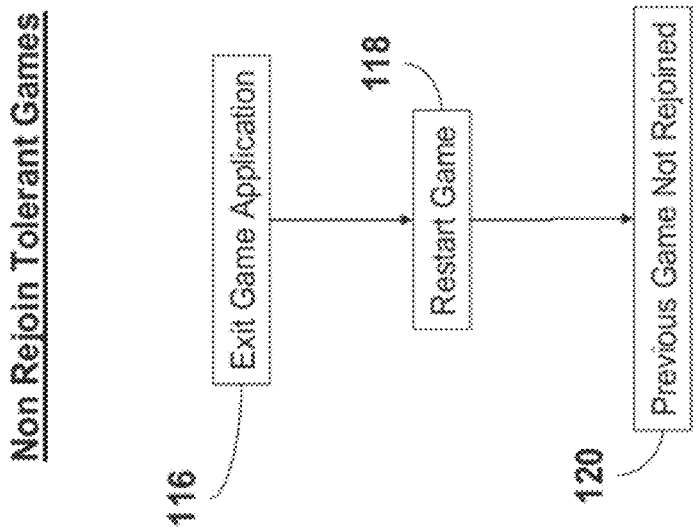
FIG. 12 is a flow diagram of an example process for resisting a game interruption attack.

FIG. 12 is a flow diagram of another example process for resisting a game interruption attack. In accordance with the process depicted in FIG. 12, rejoining a geogame is not allowed. At step 116, the game application is exited by a user action on the device. The geogame is restarted at step 118. The geogame may be restarted, for example, as a result of a request to restart the geogame by the user. The user not allowed to rejoin the geogame, as depicted at step 120.

Figure 13:
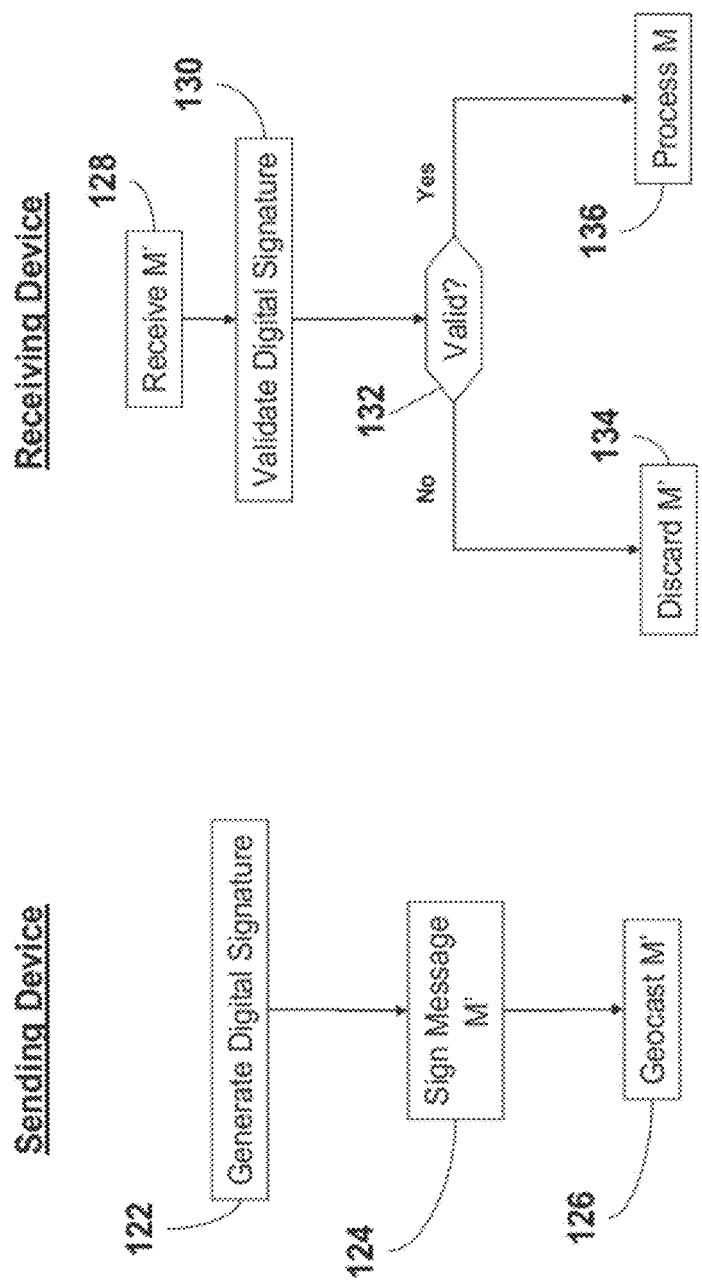
FIG. 13 is a flow diagram of an example process for achieving geogame security via a digital signature.

FIG. 13 is a flow diagram of an example process for achieving geogame security via a digital signature. At step 122, the sending device generates a digital signature for a message, M for example, using a key, K for example. The message, M, is signed with the digital signature at step 124 to generate a signed message, M' for example. In an example embodiment, the digital signature is appended to the message, M, to generate M'. The signed message, M', is geocast at step 126. At step 128, the geocast signed message, M', is received by a receiving device. The digital signature of the received signed message, M', is validated at step 130. The digital signature can be validated in any appropriate manner. If the digital signal is determined to be valid, at step 132, the message, M, is processed at step 136. If the digital signal is determined to be not valid, at step 132, the signed message, M', is discarded at step 134.

As described above, one or more pass phrase strings can be accepted at the outset of play and can be used to generate a secret shared key. For example, a single trusted player can enter a pass phrase key into the device of each player without disclosing it to other players. Assuming the trusted player is not the cheater, an external device has no way of getting the key. As another example, each of multiple players to enter a pass phrase into each device; the key is then constructed from the multiple pass phrases, with no single player knowing enough to reconstruct the key.

Figure 14:
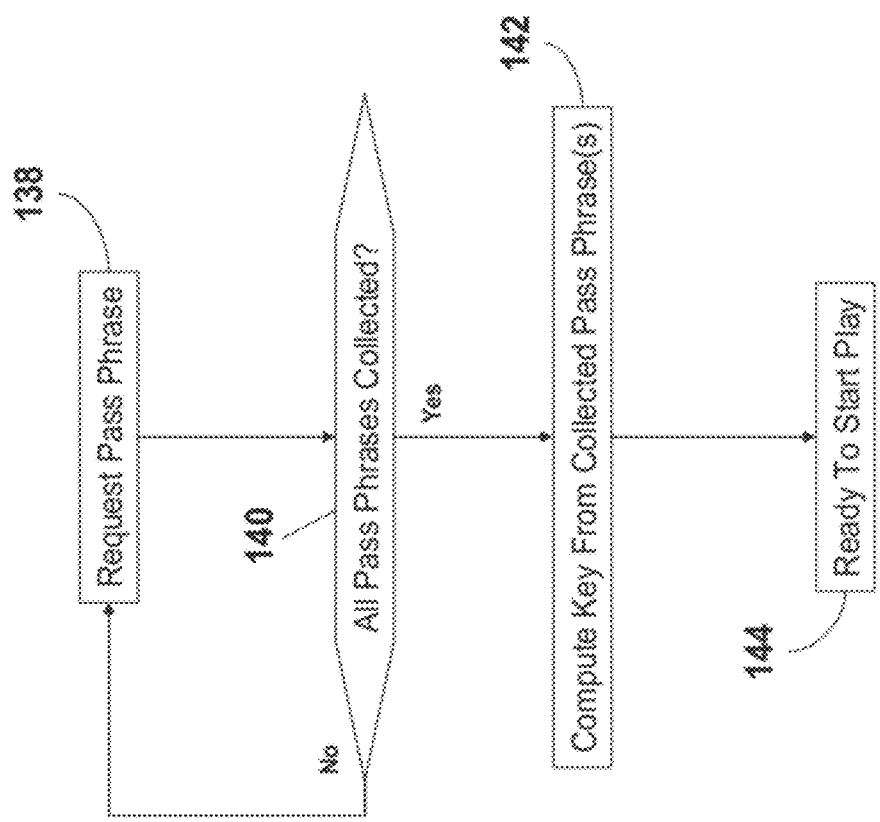
FIG. 14 is a flow diagram of an example process for achieving geogame security via a pass phrase.

FIG. 14 is a flow diagram of an example process for achieving geogame security via a pass phrase. At step 138, a pass phrase is requested for inclusion into a pass phrase string. At step 140, it is determined if all pass phrases have been collected. If it is determined, at step 140, the all pass phrases have not been collected, the process proceeds to step 138 to request another pass phrase. If it is determined, at step 140, the all pass phrases have been collected, the pass phrases are used to compute a key. That is, the key is generated based on the pass phrase, or pass phrases. Upon completion of the computation of the key, game play is ready to start, as depicted at step 144.

Figure 15:
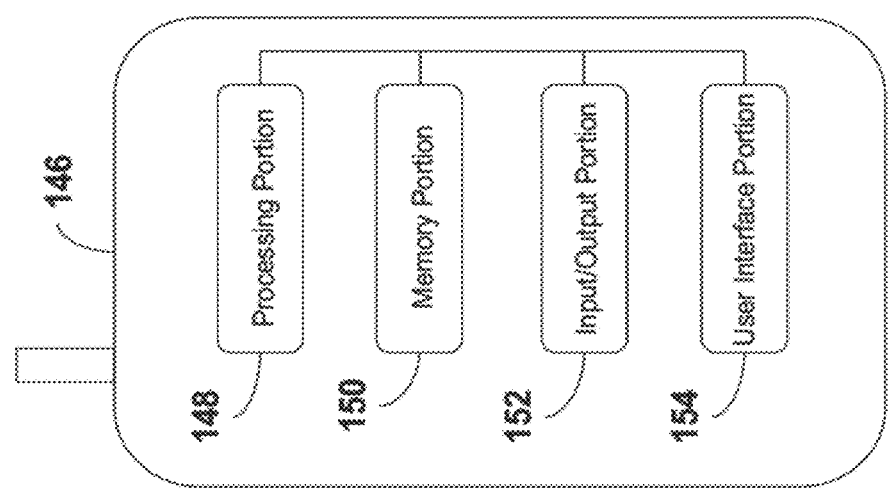
FIG. 15 is a block diagram of an example mobile device configured to facilitate secure geogaming.

FIG. 15 is a block diagram of an example communications device (also referred to as a node, or wireless terminal) 146 configured to facilitate secure geogaming. In an example configuration, communications device 146 is a mobile wireless device. The communications device 146 can comprise any appropriate device, examples of which include a portable computing device, such as a laptop, a personal digital assistant ("PDA"), a portable phone (e.g., a cell phone or the like, a smart phone, a video phone), a portable email device, a portable gaming device, a TV, a DVD player, portable media player, (e.g., a portable music player, such as an MP3 player, a walkmans, etc.), a portable navigation device (e.g., GPS compatible device, A-GPS compatible device, etc.), or a combination thereof. The communications device 146 can include devices that are not typically thought of as portable, such as, for example, a public computing device, a navigation device installed in-vehicle, a set top box, or the like. The mobile communications device 146 can include non-conventional computing devices, such as, for example, a kitchen appliance, a motor vehicle control (e.g., steering wheel), etc., or the like. As evident from the herein description, a node, and thus a communications device, is not to be construed as software per se.

The communications device 146 can include any appropriate device, mechanism, software, and/or hardware for facilitating a secure geogame as described herein. In an example embodiment, the ability to facilitate a secure geogame is a feature of the communications device 146 that can be turned on and off. Thus, an owner of the communications device 146 can opt-in or opt-out of this capabilities/resistance techniques described above.

In an example configuration, the communications device 146 comprises a processing portion 148, a memory portion 150, an input/output portion 152, and a user interface (UI) portion 154. It is emphasized that the block diagram depiction of communications device 146 is exemplary and not intended to imply a specific implementation and/or configuration. For example, in an example configuration, the communications device 146 comprises a cellular phone and the processing portion 148 and/or the memory portion 150 are implemented, in part or in total, on a subscriber identity module (SIM) of the mobile communications device 146. In another example configuration, the communications device 146 comprises a laptop computer. The laptop computer can include a SIM, and various portions of the processing portion 148 and/or the memory portion 150 can be implemented on the SIM, on the laptop other than the SIM, or any combination thereof.

The processing portion 148, memory portion 150, and input/output portion 152 are coupled together to allow communications therebetween. In various embodiments, the input/output portion 152 comprises a receiver of the communications device 146, a transmitter of the communications device 146, or a combination thereof. The input/output portion 152 is capable of receiving and/or providing information pertaining geogaming as described above. In various configurations, the input/output portion 152 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof.

The processing portion 148 is capable of performing functions pertaining to secure geogaming as described above. In a basic configuration, the communications device 146 can include at least one memory portion 150. The memory portion 150 is a storage medium having a tangible physical structure. The memory portion 150 can store any information utilized in conjunction with geogaming as described above. Depending upon the exact configuration and type of processor, the memory portion 150 can be volatile (such as some types of RAM), non-volatile (such as ROM, flash memory, etc.), or a combination thereof. The mobile communications device 146 can include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the mobile communications device 146.

The communications device 146 also can contain a user interface (UI) portion 154 allowing a user to communicate with the communications device 146. The UI portion 154 is capable of rendering any information utilized in conjunction with secure geogaming as described above. The UI portion 154 can provide the ability to control the communications device 146, via, for example, buttons, soft keys, voice actuated controls, a touch screen, movement of the mobile communications device 146, visual cues (e.g., moving a hand in front of a camera on the mobile communications device 146), or the like. The UI portion 154 can provide visual information (e.g., via a display), audio information (e.g., via speaker), mechanically (e.g., via a vibrating mechanism), or a combination thereof. In various configurations, the UI portion 154 can comprise a display, a touch screen, a keyboard, an accelerometer, a motion detector, a speaker, a microphone, a camera, a tilt sensor, or any combination thereof. The UI portion 154 can comprise means for inputting biometric information, such as, for example, fingerprint information, retinal information, voice information, and/or facial characteristic information.

The UI portion 154 can include a display for displaying multimedia such as, for example, virtual tails, players, application graphical user interfaces (GUIs), text, images, video, telephony functions such as Caller ID data, setup functions, menus, music, metadata, messages, wallpaper, graphics, Internet content, device status, preferences settings, map and location data, routes and other directions, points of interest (POI), and the like.

In some embodiments, the UI portion can comprise a user interface (UI) application. The UI application interfaces with a client or operating system (OS) to, for example, facilitate user interaction with device functionality and data. The UI application can aid a user in entering message content, viewing received messages, answering/initiating calls, entering/deleting data, entering and setting user IDs and passwords, configuring settings, manipulating address book content and/or settings, interacting with other applications, or the like, and may aid the user in inputting selections and maneuvers associated with geogaming as described herein.

Although not necessary to implement secure geogaming, a communications device can be part of and/or in communications with various wireless communications networks. Some of which are described below.

Figure 16:
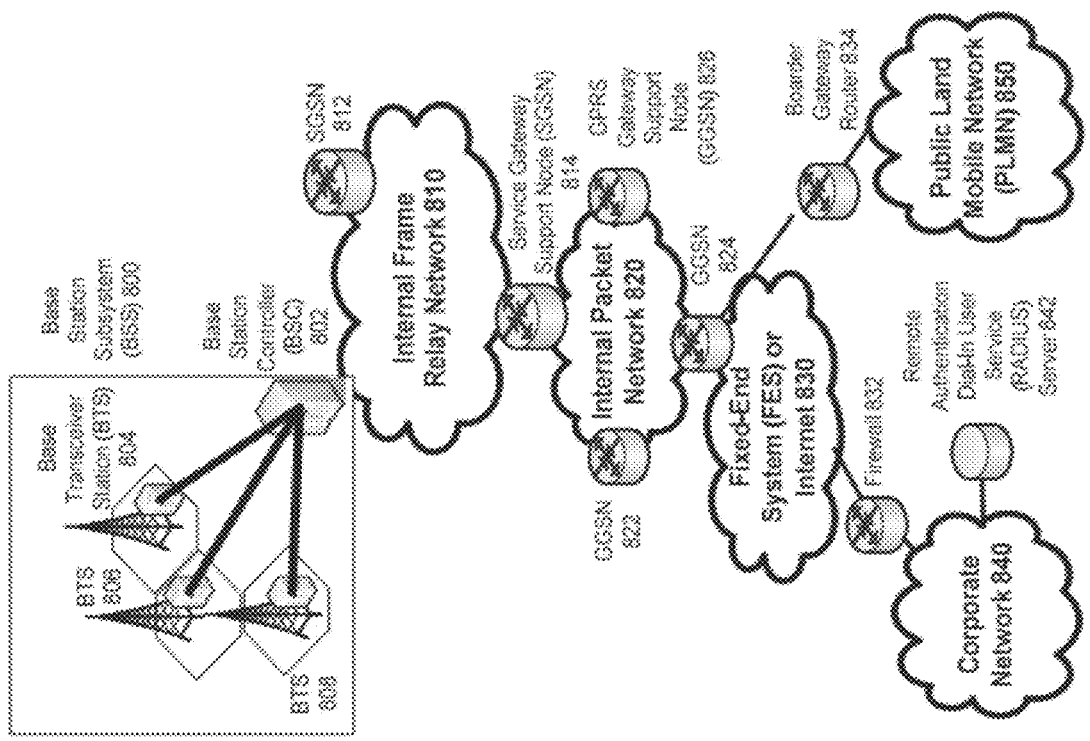
FIG. 16 depicts an overall block diagram of an exemplary packet-based mobile cellular network environment, such as a GPRS network, that can facilitate the implementation of secure geogaming.

FIG. 16 depicts an overall block diagram of an exemplary packet-based mobile cellular network environment, such as a GPRS network, that can facilitate the implementation of secure geogaming. In the exemplary packet-based mobile cellular network environment shown in FIG. 16, there are a plurality of Base Station Subsystems ("BSS") 800 (only one is shown), each of which comprises a Base Station Controller ("BSC") 802 serving a plurality of Base Transceiver Stations ("BTS") such as BTSs 804, 806, and 808. BTSs 804, 806, 808, etc. are the access points where users of packet-based mobile devices become connected to the wireless network. In exemplary fashion, the packet traffic originating from user devices is transported via an over-the-air interface to a BTS 808, and from the BTS 808 to the BSC 802. Base station subsystems, such as BSS 800, are a part of internal frame relay network 810 that can include Service GPRS Support Nodes ("SGSN") such as SGSN 812 and 814. Each SGSN is connected to an internal packet network 820 through which a SGSN 812, 814, etc. can route data packets to and from a plurality of gateway GPRS support nodes (GGSN) 822, 824, 826, etc. As illustrated, SGSN 814 and GGSNs 822, 824, and 826 are part of internal packet network 820. Gateway GPRS serving nodes 822, 824 and 826 mainly provide an interface to external Internet Protocol ("IP") networks such as Public Land Mobile Network ("PLMN") 850, corporate intranets 840, or Fixed-End System ("FES") or the public Internet 830. As illustrated, subscriber corporate network 840 may be connected to GGSN 824 via firewall 832; and PLMN 850 is connected to GGSN 824 via boarder gateway router 834. The Remote Authentication Dial-In User Service ("RADIUS") server 842 may be used for caller authentication when a user of a mobile cellular device calls corporate network 840.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 17:
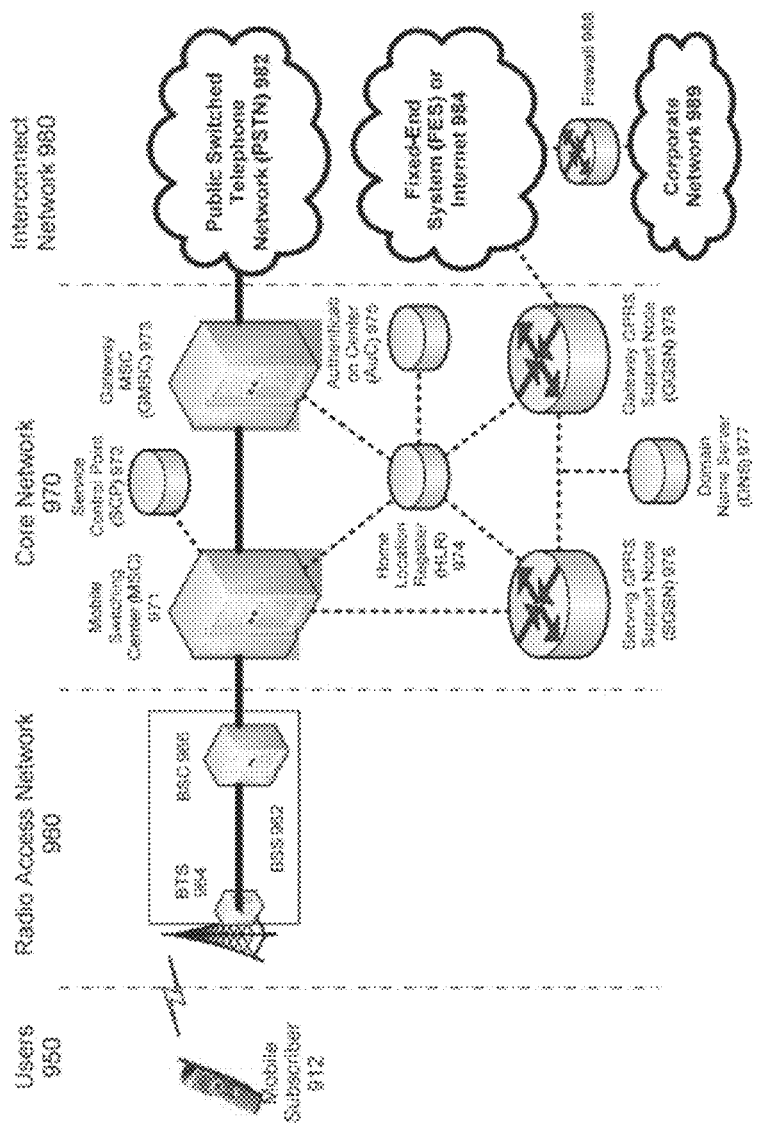
FIG. 17 illustrates an architecture of a typical GPRS network that can facilitate the implementation of secure geogaming.

FIG. 17 illustrates an architecture of a typical GPRS network that can facilitate the implementation of secure geogaming. The architecture depicted in FIG. 17 is segmented into four groups: users 950, radio access network 960, core network 970, and interconnect network 980. Users 950 comprise a plurality of end users. Note, device 912 is referred to as a mobile subscriber in the description of network shown in FIG. 17. In an example embodiment, the device depicted as mobile subscriber 912 comprises a communications device (e.g., communications device 78 12). Radio access network 960 comprises a plurality of base station subsystems such as BSSs 962, which include BTSs 964 and BSCs 966. Core network 970 comprises a host of various network elements. As illustrated in FIG. 17, core network 970 may comprise Mobile Switching Center ("MSC") 971, Service Control Point ("SCP") 972, gateway MSC 973, SGSN 976, Home Location Register ("HLR") 974, Authentication Center ("AuC") 975, Domain Name Server ("DNS") 977, and GGSN 978. Interconnect network 980 also comprises a host of various networks and other network elements. As illustrated in FIG. 17, interconnect network 980 comprises Public Switched Telephone Network ("PSTN") 982, Fixed-End System ("FES") or Internet 984, firewall 988, and Corporate Network 989.

A mobile switching center can be connected to a large number of base station controllers. At MSC 971, for instance, depending on the type of traffic, the traffic may be separated in that voice may be sent to Public Switched Telephone Network ("PSTN") 982 through Gateway MSC ("GMSC") 973, and/or data may be sent to SGSN 976, which then sends the data traffic to GGSN 978 for further forwarding.

When MSC 971 receives call traffic, for example, from BSC 966, it sends a query to a database hosted by SCP 972.

The SCP 972 processes the request and issues a response to MSC 971 so that it may continue call processing as appropriate.

The HLR 974 is a centralized database for users to register to the GPRS network. HLR 974 stores static information about the subscribers such as the International Mobile Subscriber Identity ("IMSI"), subscribed services, and a key for authenticating the subscriber. HLR 974 also stores dynamic subscriber information such as the current location of the mobile subscriber. Associated with HLR 974 is AuC 975. AuC 975 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 17, when mobile subscriber 912 initiates the attach process by turning on the network capabilities of the mobile device, an attach request is sent by mobile subscriber 912 to SGSN 976. The SGSN 976 queries another SGSN, to which mobile subscriber 912 was attached before, for the identity of mobile subscriber 912. Upon receiving the identity of mobile subscriber 912 from the other SGSN, SGSN 976 requests more information from mobile subscriber 912. This information is used to authenticate mobile subscriber 912 to SGSN 976 by HLR 974. Once verified, SGSN 976 sends a location update to HLR 974 indicating the change of location to a new SGSN, in this case SGSN 976. HLR 974 notifies the old SGSN, to which mobile subscriber 912 was attached before, to cancel the location process for mobile subscriber 912. HLR 974 then notifies SGSN 976 that the location update has been performed. At this time, SGSN 976 sends an Attach Accept message to mobile subscriber 912, which in turn sends an Attach Complete message to SGSN 976.

After attaching itself with the network, mobile subscriber 912 then goes through the authentication process. In the authentication process, SGSN 976 sends the authentication information to HLR 974, which sends information back to SGSN 976 based on the user profile that was part of the user's initial setup. The SGSN 976 then sends a request for authentication and ciphering to mobile subscriber 912. The mobile subscriber 912 uses an algorithm to send the user identification (ID) and password to SGSN 976. The SGSN 976 uses the same algorithm and compares the result. If a match occurs, SGSN 976 authenticates mobile subscriber 912.

Next, the mobile subscriber 912 establishes a user session with the destination network, corporate network 989, by going through a Packet Data Protocol ("PDP") activation process. Briefly, in the process, mobile subscriber 912 requests access to the Access Point Name ("APN"), for example, UPS.com, and SGSN 976 receives the activation request from mobile subscriber 912. SGSN 976 then initiates a Domain Name Service ("DNS") query to learn which GGSN node has access to the UPS.com APN. The DNS query is sent to the DNS server within the core network 970, such as DNS 977, which is provisioned to map to one or more GGSN nodes in the core network 970. Based on the APN, the mapped GGSN 978 can access the requested corporate network 989. The SGSN 976 then sends to GGSN 978 a Create Packet Data Protocol ("PDP") Context Request message that contains necessary information. The GGSN 978 sends a Create PDP Context Response message to SGSN 976, which then sends an Activate PDP Context Accept message to mobile subscriber 912.

Once activated, data packets of the call made by mobile subscriber 912 can then go through radio access network 960, core network 970, and interconnect network 980, in a particular fixed-end system or Internet 984 and firewall 988, to reach corporate network 989.

Figure 18:
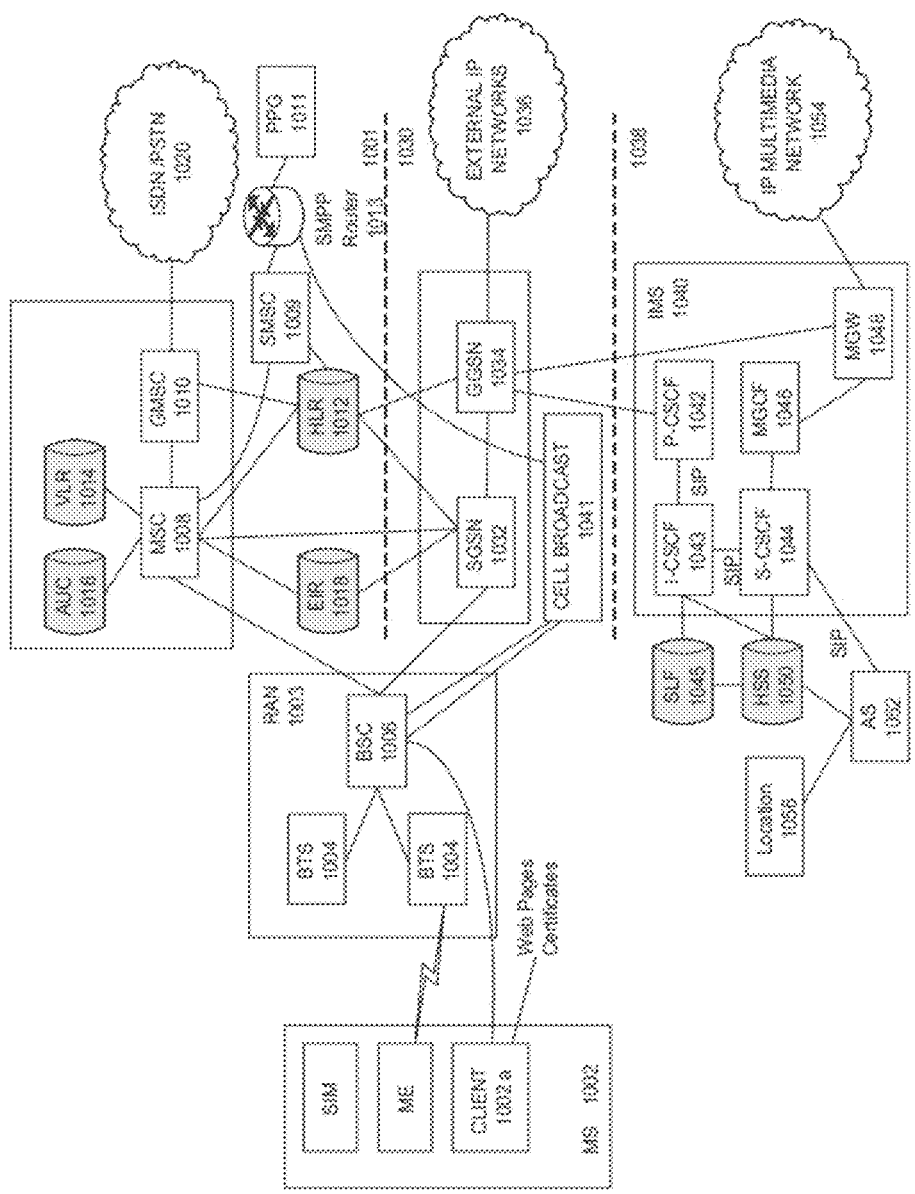
FIG. 18 illustrates an exemplary block diagram view of a GSM/GPRS/IP multimedia network architecture that can facilitate the implementation of secure geogaming.

FIG. 18 illustrates an exemplary block diagram view of a GSM/GPRS/IP multimedia network architecture that can facilitate the implementation of secure geogaming. As illustrated, the architecture of FIG. 18 includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 1004 is physical equipment, such as a radio tower, that enables a radio interface to communicate with the MS. Each BTS may serve more than one MS. The BSC 1006 manages radio resources, including the BTS. The BSC may be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. Thus, the GMSC 1010 provides interworking functionality with external networks.

The HLR 1012 is a database that contains administrative information regarding each subscriber registered in a corresponding GSM network. The HLR 1012 also contains the current location of each MS. The VLR 1014 is a database that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (i.e., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages.

SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 1041 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel. In a NOM3 network, a MS can monitor pages for a circuit switched network while received data and vise versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 may be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 may also modify an outgoing request according to a set of rules defined by the network operator (for example, address analysis and potential modification).

The I-CSCF 1043, forms an entrance to a home network and hides the inner topology of the home network from other networks and provides flexibility for selecting an S-CSCF. The I-CSCF 1043 may contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of secure geogaming have been described in connection with various computing devices/processors, the underlying concepts can be applied to any computing device, processor, or system capable of implementing secure geogames. The various techniques described herein can be implemented in connection with hardware or software or, where appropriate, with a combination of both. Thus, the methods and apparatuses of secure geogaming can be implemented, or certain aspects or portions thereof, can take the form of program code (i.e., instructions) embodied in tangible storage media having a tangible physical structure. Examples of tangible storage media include floppy diskettes, CD-ROMs, DVDs, hard drives, or tangible machine-readable storage media (tangible computer-readable storage media). When the program code is loaded into and executed by a machine, such as a computer, the machine becomes an apparatus for implementing secure geogames. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for secure geogaming also can be practiced via communications embodied in the form of program code that is transmitted over some transmission medium, such as over electrical wiring or cabling, through fiber optics, wherein, when the program code is received and loaded into and executed by a machine, such as an EPROM, a gate array, a programmable logic device (PLD), a client computer, or the like, the machine becomes an apparatus for implementing secure geogames. When implemented on a general-purpose processor, the program code combines with the processor to provide a unique apparatus that operates to invoke the functionality of secure geogaming.

While secure geogaming has been described in connection with the various embodiments of the various figures, it is to be understood that other similar embodiments can be used or modifications and additions can be made to the described embodiments for secure geogaming without deviating therefrom. For example, one skilled in the art will recognize that secure geogaming as described in the present application may apply to any environment, and may be applied to any number of such devices connected via a communications network and interacting across the network. Therefore, secure geogaming should not be limited to any single embodiment, but rather should be construed in breadth and scope in accordance with the appended claims.

What is claimed:

1. A method comprising:
    determining, by a device participating in a geogame based on a geographic location of the device, an amount of time that has passed since a previous network message was received by the device;
    determining, by the device, if the amount of time is equal to or greater than a threshold value of time;
    receiving, by the device, a geocast message;
    determining, by the device, if the received geocast message is redundant with a previously received geocast message;
    upon a determination that the received geocast message is not redundant with a previously received geocast message, comparing, by the device, embedded parameters in the received geocast message with a current state of the device; and
    determining, by the device, that
        a network interdiction attack has occurred based on:
            a determination that the amount of time is greater than a threshold value of time; and
            a determination that a current state of geogame play is not possible based on a result of the comparing of the embedded parameters in the received geocast message; or
        a network interdiction attack has not occurred based on
            a determination that the amount of time is not greater than a threshold value of time.

2. The method of claim 1, further comprising, when it is determined that the amount of time is greater than a threshold value of time, levying a penalty upon a player associated with the device.

3. The method of claim 2, wherein the penalty comprises at least one of:
    reducing game time of the player;
    ending the game; or
    reducing a game score of the player.

4. The method of claim 1, further comprising geocasting a network interdiction attack detection message.

5. The method of claim 4, wherein the network interdiction attack detection message is geocast periodically with a time period having a value less than the threshold value time.

6. The method of claim 1, further comprising:
    based on the result of the comparison indicating that the current state of geogame play is not possible, levying a penalty upon a player associated with the device.

7. The method of claim 1, further comprising:
    determining multiple locations of the device;
    determining a movement parameter of the device based on the determined multiple locations;
    determining if the movement parameter is possible for a current state of game play;
    when it is determined that the movement parameter is possible, determining that a location determination interdiction attack has not occurred; and
    when it is determined that the movement parameter is not possible, determining that a location determination interdiction attack has occurred.

8. The method of claim 1, further comprising denying, by the device, a request received prior to conclusion of the geogame to restart the geogame.

9. The method of claim 1, further comprising:
    generating a unique geogame identifier comprising an indication of an ID of the device and an indication of a start time of the geogame; and
    rendering an indication of the unique geogame identifier on the device.

10. The method of claim 1, further comprising:
    entering a pass phrase by a player associated with the device into the device and into each other device participating in the geogame;
    generating a key from the pass phrase;
    encrypting a geogame message using the key; and
    geocasting the encrypted geogame message.

11. A mobile device comprising:
a processor; and
memory coupled to the processor, the memory comprising executable instructions that when executed by the processor cause the processor to effectuate operations comprising:
    determining an amount of time that has passed since a previous geocast packet was received by the device, wherein the device is participating in a geogame based on a geographic location of the device;
    determining if the amount of time is equal to or greater than a threshold value of time;
    receiving a geocast message;
    determining if the received geocast message is redundant with a previously received geocast message;
    upon a determination that the received geocast message is not redundant with a previously received geocast message, comparing embedded parameters in the received geocast message with a current state of the device; and
    determining that
        a network interdiction attack has occurred based on
            a determination that the amount of time is greater than a threshold value of time; and
            a determination that a current state of geogame play is not possible; or
        a network interdiction attack has not occurred based on a determination that the amount of time is not greater than a threshold value of time.

12. The device of claim 11, the operations further comprising, when it is determined that the amount of time is greater than a threshold value of time, levying a penalty upon a player associated with the device.

13. The device of claim 12, wherein the penalty comprises at least one of:
    reducing game time of the player;
    ending the game; or
    reducing a game score of the player.

14. The device of claim 11, the operations further comprising geocasting a network interdiction attack detection message.

15. The device of claim 14, wherein the network interdiction attack detection message is geocast periodically with a time period having a value less than the threshold value time.

16. The device of claim 11, the operations further comprising:
    based on a result of the comparison indicating that a current state of geogame play is not possible, levying a penalty upon a player associated with the device.

17. The device of claim 11, the operations further comprising:
    determining multiple locations of the device;
    determining a movement parameter of the device based on the determined multiple locations;
    determining if the movement parameter is possible for a current state of game play;
    when it is determined that the movement parameter is possible, determining that a location determination interdiction attack has not occurred;
    when it is determined that the movement parameter is possible, determining that a location determination interdiction attack has occurred.

18. The device of claim 11, the operations further comprising denying a request received prior to conclusion of the geogame to restart the geogame.

19. The device of claim 11, the operations further comprising:
    generating a unique geogame identifier comprising an indication of an ID of the device and an indication of a start time of the geogame; and
    rendering an indication of the unique geogame identifier on the device.

* * * * *